(12) United States Patent
Hasegawa et al.

(10) Patent No.: US 10,062,235 B2
(45) Date of Patent: Aug. 28, 2018

(54) COIN RECOGNITION UNIT

(71) Applicant: GLORY LTD., Himeji-shi, Hyogo (JP)

(72) Inventors: Ryo Hasegawa, Himeji (JP); Hidekazu Tanaka, Himeji (JP); Hirofumi Kamatani, Himeji (JP); Kazumasa Morimoto, Himeji (JP); Yusuke Ohno, Himeji (JP); Yuji Adachi, Himeji (JP); Naoki Tomigaki, Himeji (JP); Masatoshi Kageyama, Himeji (JP)

(73) Assignee: GLORY LTD., Himeji-shi, Hyogo (JP)

( * ) Notice: Subject to any disclaimer, the term of this patent is extended or adjusted under 35 U.S.C. 154(b) by 0 days.

(21) Appl. No.: 15/617,116

(22) Filed: Jun. 8, 2017

(65) Prior Publication Data

US 2017/0358162 A1    Dec. 14, 2017

(30) Foreign Application Priority Data

Jun. 9, 2016 (JP) .................................. 2016-115624
Jun. 9, 2016 (JP) .................................. 2016-115625

(51) Int. Cl.
| | |
|---|---|
| *G01N 21/00* | (2006.01) |
| *G07D 5/08* | (2006.01) |
| *G01B 7/06* | (2006.01) |
| *G01B 7/12* | (2006.01) |
| *G01B 21/30* | (2006.01) |
| *G01V 8/10* | (2006.01) |
| *G07D 5/02* | (2006.01) |
| *G07D 5/00* | (2006.01) |

(52) U.S. Cl.
CPC .................. *G07D 5/08* (2013.01); *G01B 7/10* (2013.01); *G01B 7/12* (2013.01); *G01B 21/30* (2013.01); *G01V 8/10* (2013.01); *G07D 5/005* (2013.01); *G07D 5/02* (2013.01)

(58) Field of Classification Search
CPC ........ G01J 3/02; H01J 37/32935; G07D 5/08; G07D 5/02; G01B 21/30; G01B 7/06; G01B 7/12; G01V 8/10; G01N 21/64; G01N 21/68
See application file for complete search history.

(56) References Cited

U.S. PATENT DOCUMENTS

2013/0178139 A1* 7/2013 Hallowell ................ G07D 7/00
453/15

FOREIGN PATENT DOCUMENTS

| JP | 9-161119 A | 6/1997 |
|---|---|---|
| JP | 9-231432 A | 9/1997 |
| JP | 2001-216550 A | 8/2001 |

(Continued)

*Primary Examiner* — Abullahi Nur
(74) *Attorney, Agent, or Firm* — Renner, Kenner, Greive, Bobak, Taylor & Weber

(57) ABSTRACT

The present invention provides a coin recognition unit having high recognition capacity. The coin recognition unit comprises magnetic sensors each configured to collect magnetic characteristics of a transported coin; at least one optical sensor disposed with a space from the magnetic sensors and configured to collect optical characteristics of a surface of the coin; a glass plate constituting a transport surface on which the coin is transported and having a larger size than the coin; and a controller configured to control the magnetic sensors and the at least one optical sensor and perform a recognition process, the glass plate covering at least part of each magnetic sensor and at least part of each optical sensor.

13 Claims, 15 Drawing Sheets

(56) References Cited

FOREIGN PATENT DOCUMENTS

| | | | |
|---|---|---|---|
| JP | 2006-268484 | A | 10/2006 |
| JP | 2010-20629 | A | 1/2010 |

* cited by examiner

COIN RECOGNITION UNIT

CROSS-REFERENCE TO RELATED APPLICATIONS

The present application claims priority under 35 U.S.C. § 119 to Japanese Patent Application No. 2016-115625 filed on Jun. 9, 2016 and Japanese Patent Application No. 2016-115624 filed on Jun. 9, 2016, the contents of which are incorporated herein by reference in their entirety.

BACKGROUND OF THE INVENTION

Field of the Invention

The present invention relates to coin recognition units and coin recognition methods. The present invention specifically relates to a coin recognition unit suited for recognition of coins such as bi-metallic coins and stained coins, and a coin recognition unit and a coin recognition method which are suited for recognition of the stained condition of coins.

Discussion of the Background

Conventional coin handling machines used for handling (e.g., recognizing, counting) of coins include a coin recognition unit provided with sensors that recognize the denominations of coins.

Japanese patent application JP H09-161119 A discloses a coin recognition unit including a magnetic sensor and a light sensor combined integrally with the magnetic sensor such that the optical axis thereof passes through an opening of a cylindrical core of the magnetic sensor, the magnetic sensor magnetically detecting a coin, the light sensor irradiating the coin with light and optically detecting the light-shielded area formed by the coin.

Also, some conventional coin handling machines include a coin recognition unit provided with an optical sensor that recognizes stained coins.

Japanese patent application JP 2006-268484 A discloses a coin recognition unit including first and second stain detection modules each provided with an irradiation means that irradiates the surface of a coin with light, a first light-receiving means that receives specular reflection light from the surface of the coin, and a second light-receiving means that receives diffuse reflection light from the surface of the coin, the first and second stain detection modules being disposed to face the surface of the coin path (the aligning-side portion of the path for transported coins).

Japanese patent application JP 2010-20629 A discloses a stained condition recognition unit in which reflective optical sensors each including a light-emitting means and a light-receiving means are arranged for each of the face and back of a plate-like object, in the direction orthogonal to the moving direction of the plate-like object.

Japanese patent application JP 2001-216550 A discloses a technique for authentication of a coin based on the color of the metal of the coin, which is a coin recognition unit including first and second emission elements irradiating the coin with light components having different wavelengths (e.g., blue light and infrared light or red light), and a light-receiving element receiving light components emitted by the emission elements and reflected on the coin.

Coin recognition units are desired to be capable of, for example, firstly recognizing the denominations with precision high enough to detect bi-metallic coins which are a type of coin used for large denomination coins, and secondly screening stained coins. The coin recognition unit disclosed in JP H09-161119 A, however, can detect only the diameter, thickness, and material of a coin, having low recognition capacity. If the coin recognition unit included sensor units to achieve these desired functions, said sensor units being placed side by side in the transport path for coins, the levels of height of the sensor units would be different and cause the coins to behave unstably during transport. For example, a coin, when passing the point with a height difference, may bound, come off the path, move out of the line of coins on the aligning side, or behave in any other undesired manner to be incorrectly recognized.

The coin recognition unit disclosed in JP 2006-268484 A includes the stain detection modules only on the aligning side of coins. The unit can therefore detect only one portion of each of the face and back of a coin, and cannot detect a partial stain on the coin. Also, the modules include many components and are thus complicated. It is therefore difficult to arrange this coin recognition unit together with another recognition unit, such as a recognition unit including a magnetic sensor, at a narrow pitch.

In the stained condition recognition unit disclosed in JP 2010-20629 A, each light-receiving means receives reflected light resulting from reflection of light emitted by the light-emitting means constituting the same optical sensor, i.e., the light-emitting means closely arranged in the coin transport direction. The stained condition recognition unit recognizes the stained condition of a coin based on the outputs from these light-receiving means. The stained condition recognition unit therefore cannot easily recognize difference in color of coins, and thus fails to authenticate the coins.

The coin recognition unit disclosed in JP 2001-216550 A can determine the color of a coin, but cannot recognize a stain on the coin.

There is therefore a need to solve the above problems, and to provide a coin recognition unit having high recognition capacity.

Furthermore, there is a need to provide a coin recognition unit and a coin recognition method which allows recognition of a stain in a broad range of at least one of the face and back of a coin and detection of difference in color of coins.

SUMMARY OF THE INVENTION

According to a first aspect of the present invention, there is provided a coin recognition unit comprising magnetic sensors each configured to collect magnetic characteristics of a transported coin; at least one optical sensor disposed with a space from the magnetic sensors and configured to collect optical characteristics of a surface of the coin; a glass plate constituting a transport surface on which the coin is transported and having a larger size than the coin; and a controller configured to control the magnetic sensors and the at least one optical sensor and perform a recognition process, the glass plate covering at least part of each magnetic sensor and at least part of each optical sensor.

The magnetic sensors may include a diameter detection sensor configured to output a signal corresponding to the diameter of the coin, and the diameter detection sensor includes an excitation coil and a detection coil that are disposed to face each other with the transport surface in between.

The magnetic sensors may include a magnetism detection sensor configured to detect the presence or absence of magnetism of the coin, and the magnetism detection sensor includes a magnetism detecting element.

The magnetic sensors may include a material detection sensor configured to detect material characteristics of the coin.

The material detection sensor may include a first material detection sensor disposed near an outer periphery of the transported coin, and a second material detection sensor disposed near a center portion, excluding the outer periphery, of the transported coin, and the controller is configured to compare an output signal from the first material detection sensor and an output signal from the second material detection sensor to determine whether the coin is made of a single material or multiple materials.

The at least one optical sensor may include a light source configured to emit light having multiple wavelengths and a light-receiving element.

The at least one optical sensor may include a plurality of optical sensors that are disposed in a direction crossing the transport direction of the coin.

The optical sensors may be disposed in a direction orthogonal to the transport direction and parallel to the transport surface.

The optical sensors may partially overlap each other in a direction orthogonal to the transport direction of the coin.

The controller may be configured to determine the presence or absence of the coin on the transport surface based on an output signal from the at least one optical sensor.

The coin recognition unit may further include a wall disposed on one side of the transport surface and a thickness detection sensor disposed on the side of the wall opposite to the transport surface, wherein the coin is transported on the transport surface while being aligned on the wall side, and the thickness detection sensor is a magnetic sensor configured to output a signal corresponding to the thickness of the coin.

The glass plate may be made of sapphire glass.

The coin recognition unit may further include a mounting member on which the glass plate is mounted, and an adhesive member binding the glass plate to the mounting member, wherein the mounting member includes: a first surface being in direct contact with the glass plate; a second surface disposed at a lower position than the first surface and coated with an adhesive; and a third surface disposed at a lower position than the second surface and between the first surface and the second surface.

The coin recognition unit of the first aspect of the present invention can have higher recognition capacity.

A second aspect of the present invention is directed to a coin recognition unit comprising at least one light source configured to irradiate the face or back of a transported coin with light; light-receiving elements each configured to receive light reflected on the coin; and a controller configured to control the at least one light source and the light-receiving elements and perform a recognition process, the light-receiving elements being disposed at different distances from the at least one light source, the controller being configured to collect output signals from the light-receiving elements that have received light reflected on the coin in the same period of time, and to perform the recognition process based on the collected output signals.

The controller may be configured to determine the degree of a stain on the coin based on an output signal from the light-receiving element disposed closest to the at least one light source among the light-receiving elements.

The at least one light source may emit red light, green light, and blue light.

The controller may be configured to determine the color of the coin based on an output signal from the light-receiving element second closest to the at least one light source among the light-receiving elements, and the output signal from the second closest light-receiving element includes at least two signals of a signal indicating receipt of reflected light resulting from reflection of red light on the coin, a signal indicating receipt of reflected light resulting from reflection of green light on the coin, and a signal indicating receipt of reflected light resulting from reflection of blue light on the coin.

The at least one light source may include a plurality of light sources corresponding to the respective light-receiving elements, each of the light-receiving elements and the corresponding light source constitute an optical sensor, the controller is configured to control the optical sensors, and the optical sensors include optical sensors disposed in a direction crossing the transport direction of the coin on the side facing the back of the transported coin and optical sensors disposed in a direction crossing the transport direction on the side facing the face of the transported coin.

The controller may be configured to collect, upon emission by the at least one light source, an output signal from the light-receiving element included in the same optical sensor and an output signal from the light-receiving element in a different optical sensor.

The plurality of light sources may include a light source configured to emit light having multiple wavelengths, and the controller is configured to sequentially turn on the plurality of light sources by avoiding simultaneous emission of the plurality of light sources and simultaneous emission of the light having the multiple wavelengths.

The coin recognition unit may include a coin-passage detection light source that is disposed such that the light emitted by the light source is directly incident on one of the light-receiving elements, and the controller recognizes the presence or absence of the coin on the transport surface based on receipt of light by the light-receiving element on which the light emitted by the coin-passage detection light source is directly incident.

The second aspect of the present invention is also directed to a coin recognition method comprising the steps of: irradiating the front or back of a transported coin with light from a light source and using light-receiving elements disposed at different distances from the light source to receive light reflected on the coin; and performing a recognition process based on output signals from the light-receiving elements that have received light reflected on the coin in the same period of time.

The coin recognition unit and the coin recognition method of the second aspect of the present invention allows recognition of a stain in a broad range of at least one of the face and back of a coin and detection of difference in color of coins.

BRIEF DESCRIPTION OF DRAWINGS

FIGS. 6A-6B include schematic views describing the positional relationship between coins and optical sensors in Embodiment 1, wherein FIG. 6A is a cross-sectional view and FIG. 6B is a plan view.

DESCRIPTION OF EMBODIMENTS

Figure 1:
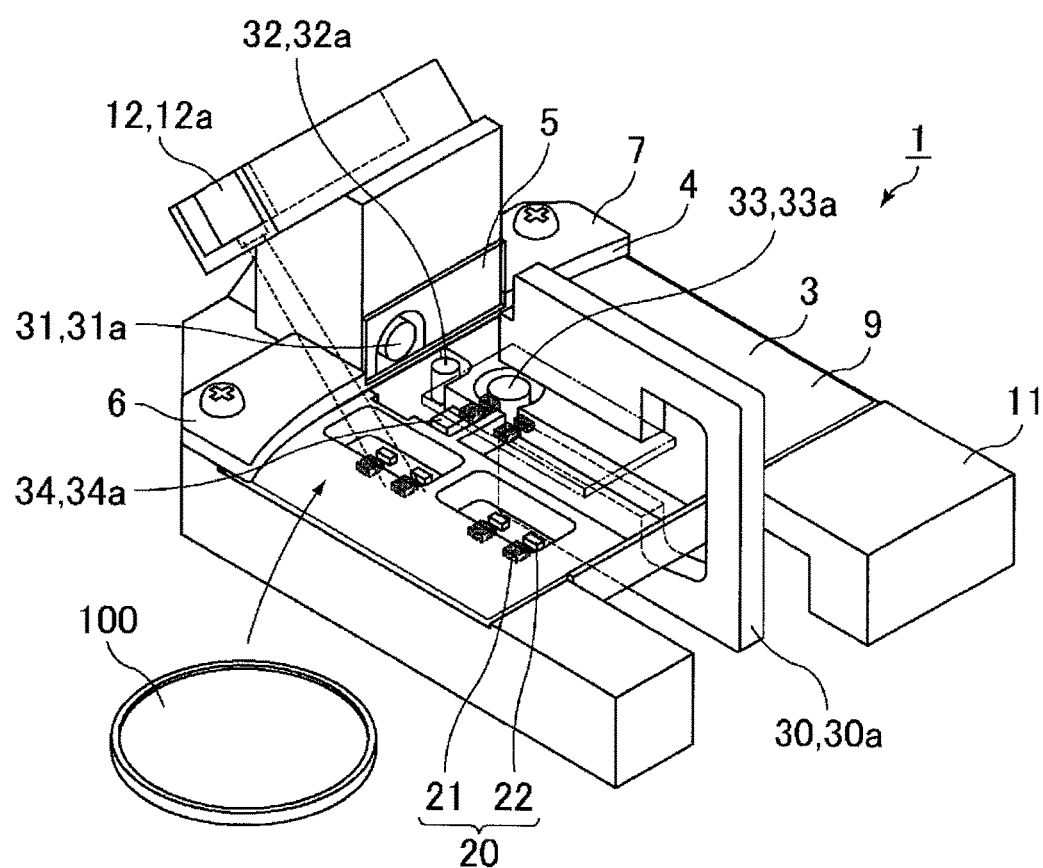
FIG. 1 is a schematic perspective view of a coin recognition unit according to a first embodiment of the invention.

Hereinafter, a preferred embodiment of the coin recognition unit of a first aspect of the present invention and the coin recognition unit and the coin recognition method of a second aspect of the present invention is described in detail with reference to the drawings.

The coin recognition unit and the coin recognition method of the present embodiment are used to recognize and count coins in a coin handling machine.

As illustrated in FIGS. 1 to 4, a coin recognition unit 1 of the present embodiment includes a transport path 2 on which coins 100 are transported. A timing sensor 12 is configured to detect entry of any coin 100 into the coin recognition unit 1, and optical sensors 20 are configured to detect a stain and the color of the coin 100. A diameter detection sensor 30 which is a magnetic sensor is configured to detect the diameter of the coin 100, a thickness detection sensor 31 which is a magnetic sensor is configured to detect the thickness of the coin 100, and a ring detection sensor (first material detection sensor) 32 which is a magnetic sensor is configured to detect material characteristics of the near outer periphery of the coin 100. A core detection sensor (second material detection sensor) 33 which is a magnetic sensor is configured to detect material characteristics of the near center portion of the coin 100 other than the outer periphery, and a magnetism detection sensor 34 which is a magnetic sensor is configured to detect the presence or absence of the magnetism of the coin 100. These sensors constitute an integrated sensor unit.

The separate sensors provided for the respective detection target characteristics enable highly precise detection, increasing the recognition capacity (recognition precision) of the coin recognition unit 1. Such a configuration also enables determination of various (global) denominations. In addition, combining sensors into one unit contributes to cost and space savings.

The coins 100 are transported one by one, with spaces in between, on the transport path 2 by a transport device of the coin handling machine, such as a fin 70. The transport path 2 of the coin recognition unit 1 constitutes part of an arc-like transport path of the coin handling machine, and includes a smooth transport surface 3 supporting the bottom surface of the coin 100 and a guide surface 4 designed to come into contact with the peripheral surface of each coin 100 to guide the coin 100 to the aligning side. The coin 100 slides on the transport surface 3 while being guided to the aligning side (the end on the guide surface 4 side) of the transport path 2, i.e., while being in contact with the guide surface 4.

The transport surface 3 is composed of one glass plate 9 having a rectangle shape. The glass plate 9 is made of sapphire glass for its strength and transparency. The glass plate 9 is larger than the coins 100 with the greatest diameter among the recognition target coins 100. The glass plate 9 is mounted on (attached to) a mounting member 11 with an adhesive member described later.

The guide surface 4 consists of a flat plate-shaped wall 5 that is made of a ceramic such as zirconia; wall members 6 and 7 that are made of a metal or hard resin are provided on the upstream side and the downstream side of the wall 5 respectively. The parts of the wall members 6 and 7 constituting the guide surface 4 are each arc-shaped, overlapping the outer periphery of the rectangular glass plate 9. The overall shape of the guide surface 4 is therefore made into a gentle arc.

Figure 4:
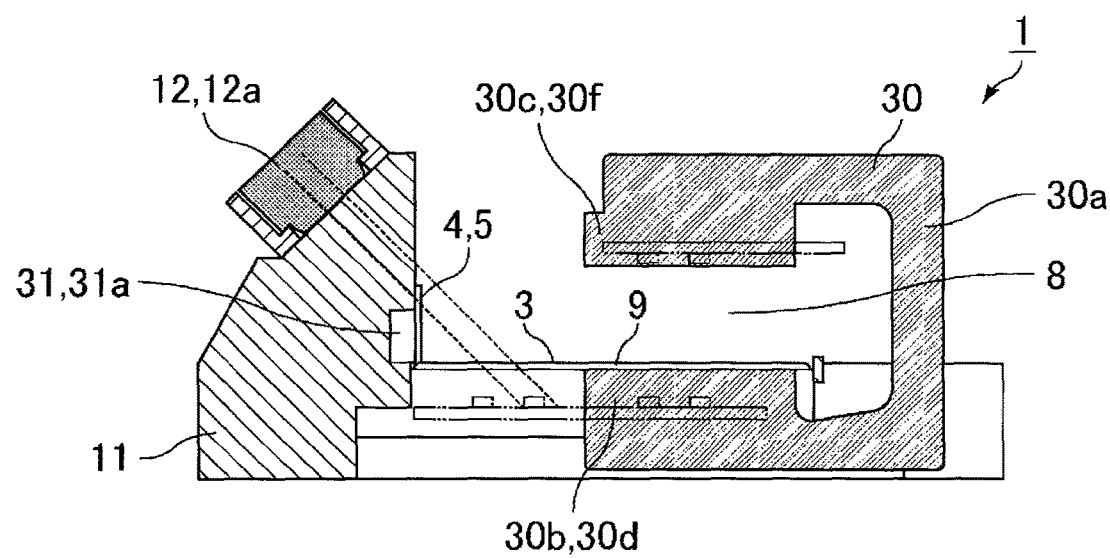
FIG. 4 is a schematic cross-sectional view of the coin recognition unit of a first embodiment of the invention, illustrating a cross section taken along the line B1-B2 in FIG. 2.
Figure 5:
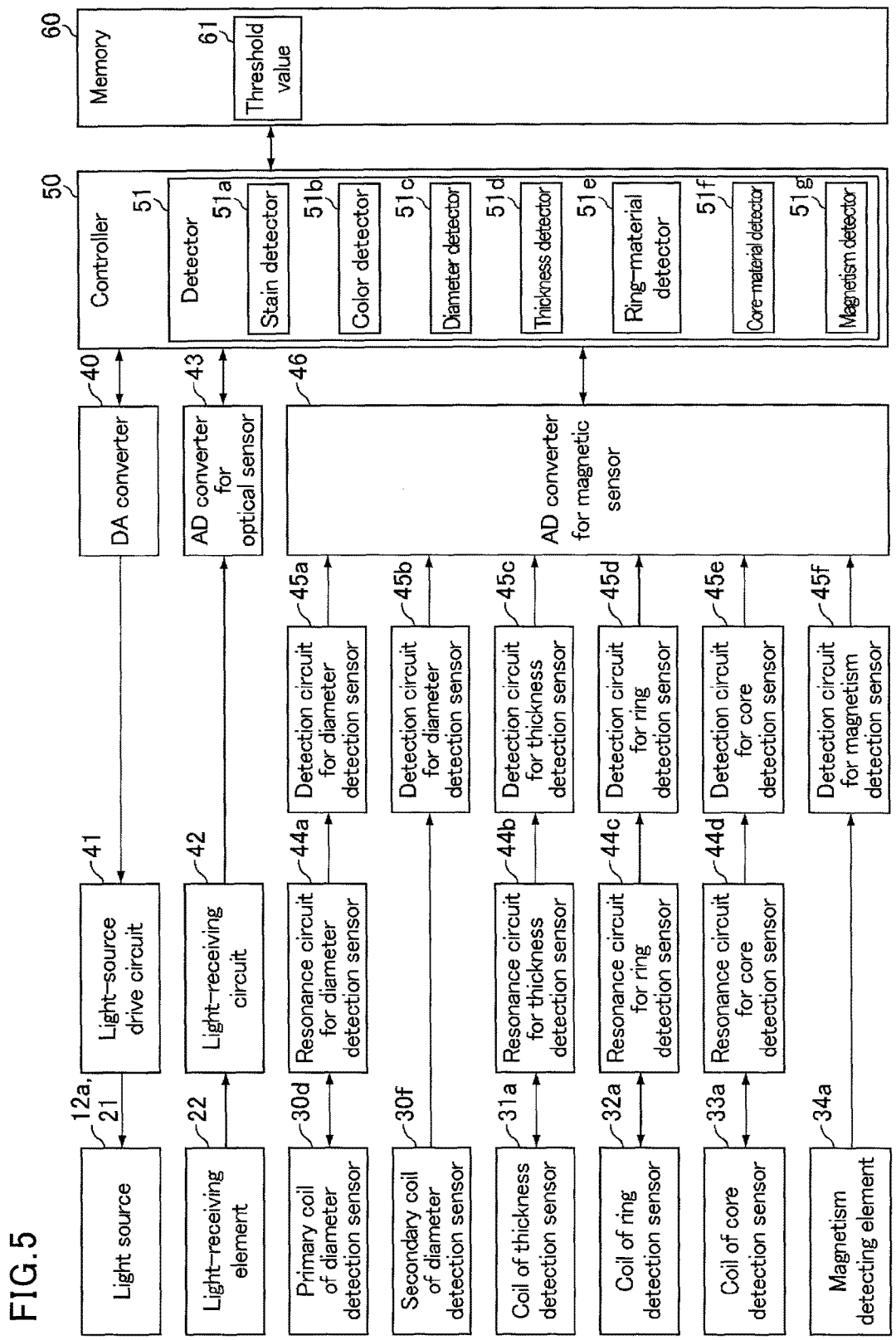
FIG. 5 is a functional block diagram of the coin recognition unit of a first embodiment of the invention.

As illustrated in FIG. 5, the coin recognition unit 1 includes, as well as the members illustrated in FIGS. 1 to 4, a DA (digital to analog) converter 40, a light-source drive circuit 41, a light-receiving circuit 42, an AD (analog to digital) converter 43 for the optical sensors, a resonance circuit 44a for the diameter detection sensor, a resonance circuit 44b for the thickness detection sensor, and a resonance circuit 44c for the ring detection sensor. The coin recognition unit 1 further includes a resonance circuit 44d for the core detection sensor, detection circuits 45a and 45b for the diameter detection sensor, a detection circuit 45c for the thickness detection sensor, a detection circuit 45d for the ring detection sensor, a detection circuit 45e for the core detection sensor, a detection circuit 45f for the magnetism detection sensor, an AD converter 46 for the magnetic sensors, a controller 50, and a memory 60.

The controller 50 includes a detector 51. The detector 51 includes a stain detector 51a, a color detector 51b, a diameter detector 51c, a thickness detector 51d, a ring-material detector 51e, a core-material detector 51f, and a magnetism detector 51g.

Each of the optical sensors 20 is a reflective optical sensor including a light source 21 such as an LED (light emitting diode) and a light-receiving element 22 such as a photodiode. The light sources 21 and the light-receiving elements 22 are each mounted on one of two substrates 23 on the respective upper and lower sides of the transport surface 3. The substrate 23 on the upper side and the diameter detection sensor 30 are held by a holding member not illustrated.

Two or more of the optical sensors 20 are aligned on each of the upper side and the lower side of the transport surface 3, preferably in a direction crossing the transport direction of the coins 100, more preferably in the width direction of the transport path 2 (the direction substantially orthogonal to the transport direction of the coins 100). For example, four optical sensors 20a, 20b, 20c, and 20d are disposed on the lower side from the aligning side of the coins 100, and two optical sensors 20e and 20f are disposed on the upper side from the aligning side of the coins 100. This configuration enables detection of the optical characteristics in a broad range of the upper and lower surfaces (especially the lower surface) of each coin 100. The optical sensors 20a to 20d are disposed on one plane parallel to the transport surface 3, and the optical sensors 20e and 20f are also disposed on another plane parallel to the transport surface 3.

Each optical sensor 20 includes the light source 21 on the upstream side and the light-receiving element 22 on the downstream side. The optical sensors 20 on the upper side are disposed to face two optical sensors 20 on the non-aligning side (i.e., the side opposite to the guide surface 4) of the coins 100 among the optical sensors 20 on the lower side, and are disposed directly above these two optical sensors 20 on the lower side.

Figure 6A:
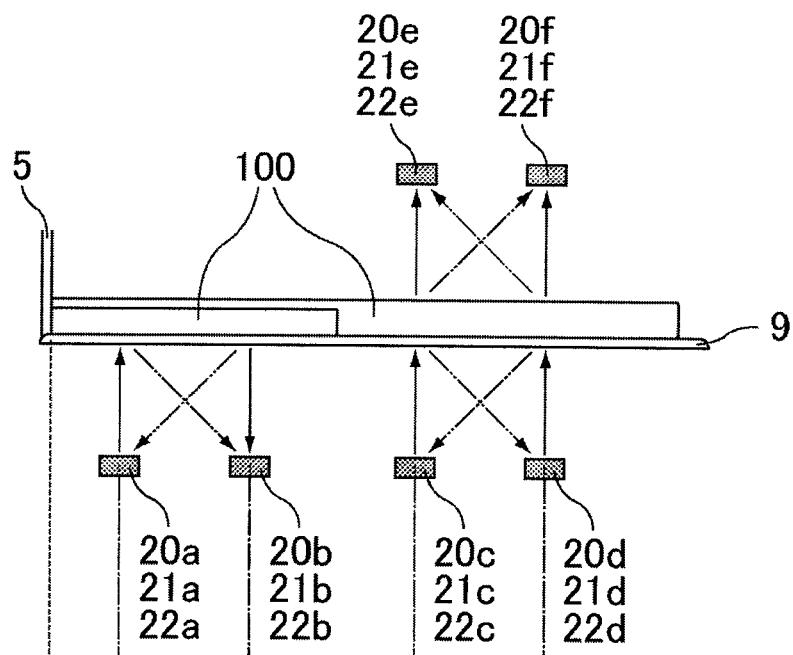
Figure 6B:
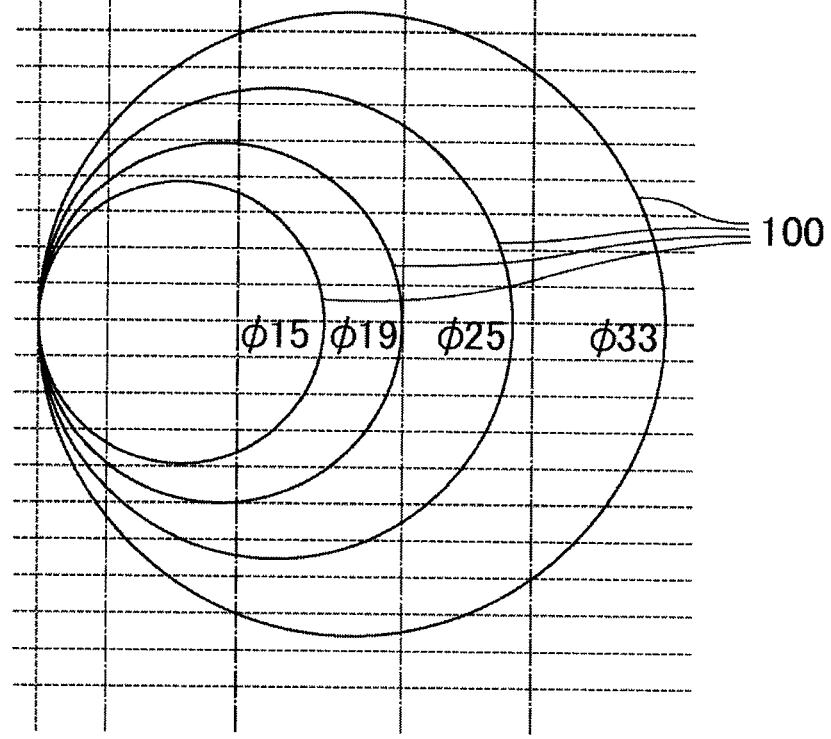

As illustrated in FIGS. 6A and 6B, the optical sensors 20a to 20d on the lower side are disposed to overlap the coins 100 having the greatest diameter among multiple types of the detection target coins 100. The optical sensors 20a and 20b on the aligning side among the optical sensors 20a to 20d are disposed to overlap the coins 100 having the smallest diameter among multiple types of the detection target coins 100. The optical sensors 20e and 20f on the upper side are disposed not to overlap the coins 100 having the smallest diameter among multiple types of the detection target coins 100.

Figure 7:
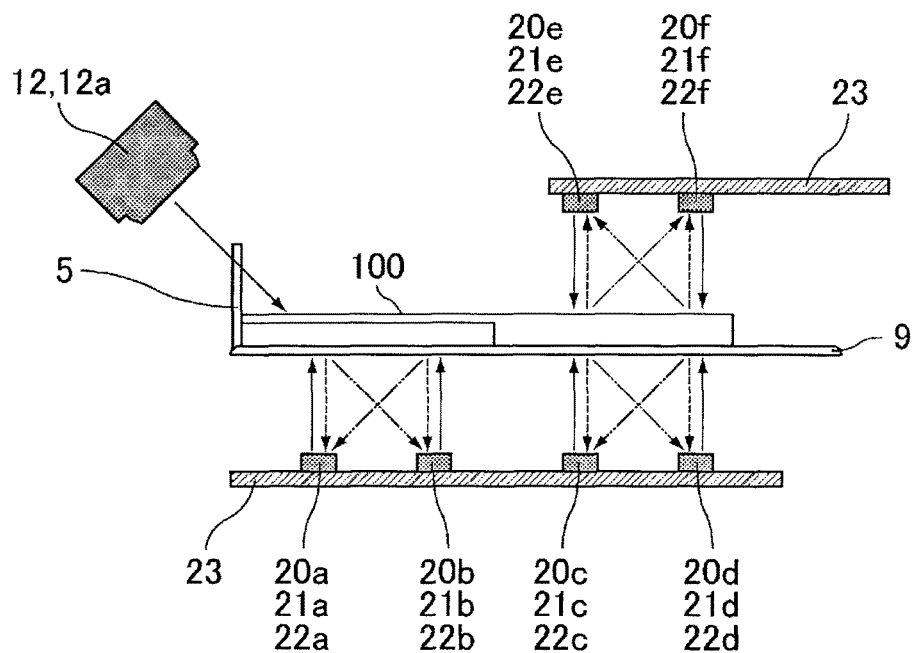
FIG. 7 is a schematic cross-sectional view describing the positional relationship between optical sensors of a first embodiment of the invention.

As illustrated in FIG. 7, each light source 21 irradiates with spot-like light the upper surface or lower surface. The light sources 21 on the upper side irradiate the upper surface, the light sources 21 on the lower side irradiate the lower surface of each coin 100 transported on the transport path 2. Each light-receiving element 22 receives the spot-like reflected light which is emitted by the corresponding light source 21 and reflected on the upper surface or lower surface (the upper surface for the light-receiving element 22 on the upper side, the lower surface for the light-receiving element 22 on the lower side) of the coin 100. Here, each light-receiving element 22 can receive not only the reflected light resulting from reflection of light emitted by the light source 21 of the same optical sensor 20 (the closest light source 21), but also the reflected light resulting from reflection of light emitted by a light source 21 of another optical sensor 20.

The light-receiving elements 22 of the optical sensors 20 on the upper side can each receive light emitted by a light source 21 of any of the optical sensors 20 on the lower side. Similarly, the light-receiving elements 22 of the optical sensors 20 on the lower side can each receive light emitted by a light source 21 of any of the optical sensors 20 on the upper side. The optical sensors 20 therefore can function as transmissive sensors, and the controller 50 can determine the presence or absence of a coin 100 (any object other than transparent media) based on outputs from the optical sensors 20.

For an increase in the capacity of the optical sensors 20 to detect a difference in color of the coins 100, the light sources 21a, 21b, 21c, 21d, 21e, and 21f of the respective optical sensors 20a, 20b, 20c, 20d, 20e, and 20f are each configured to be able to emit light components with different wavelengths, preferably red light, green light, and blue light. Specifically, the light sources 21a, 21b, 21c, 21d, 21e, and 21f each include, as the emission elements, three LEDs emitting the respective light components of red, green, and blue.

The controller 50 is configured to perform dynamic lighting control of sequentially turning on these light sources 21 and a light source 12a for coin passage detection described below by avoiding simultaneous emission of the light sources 21 and the light source 12a for coin passage detection and simultaneous emission of the light components of different wavelengths.

During emission by each light source 21, the controller 50 is configured to collect and save an output from the light-receiving element 22 of the optical sensor 20 including the light source 21 (the light-receiving element 22 closest to the light source 21) and collect and save an output from the light-receiving element 22 second closest to the light source 21. In the present embodiment, the light-receiving elements 22 second closest to the respective light sources 21a, 21b, 21c, 21d, 21e, and 21f are the light-receiving elements 22b, 22a, 22d, 22c, 22f, and 22e of the optical sensors 20b, 20a, 20d, 20c, 20f, and 20e.

Each optical sensor 20 detects the degree of a stain (glossiness) of each coin 100 based on the output from the light-receiving element 22 having received light resulting from reflection of the light emitted by the light source 21 included in the same optical sensor 20 (the closest light source 21). Each optical sensor 20 detects a difference in color of the coin 100 based on the output from the light-receiving element 22 having received light resulting from reflection of the light emitted by the light source 21 of the adjacent optical sensor 20 in the width direction of the transport path 2 (the second closest light source 21).

The timing sensor 12 includes the light source 12a for coin passage detection (e.g., LED) and the light-receiving element 22b of one optical sensor 20b disposed below the transport surface 3. The light-receiving element 22b constitutes both the timing sensor 12 and the optical sensor 20b, contributing to miniaturization of the coin recognition unit 1 and provides cost savings.

The light source 12a is disposed obliquely above the aligning side (guide surface 4 side) of the transport path 2, with its optical axis set such that the light therefrom is directly incident on the light-receiving element 22b. The light source 12a includes as a light-emitting element only one LED which emits infrared light.

When the coin 100 enters the transport path 2, the light emitted by the light source 12a is blocked by the coin 100 and is not received by the light-receiving element 22b. Based on detection of the entry of the coin 100 into the transport path 2 by the timing sensor 12 as described above, the timing of the coin recognition process is determined.

The DA converter 40 is configured to convert a digital signal input by the controller 50 containing information of emissions from the light sources 12a and 21 into an analog signal. The light-source drive circuit 41 supplies a current corresponding to the output signal from the DA converter 40 to the light sources 12a and 21 at the timing directed by the controller 50.

The light-receiving circuit 42 is configured to convert the output (electric current level) from each light-receiving element 22 into a voltage value. The AD converter 43 for the optical sensors is configured to sample the analog signals input by the light-receiving circuit 42 at every given time with a certain sampling interval, and convert each signal into a digital signal.

The diameter detection sensor 30 includes one C-shaped core plate 30a. The core plate 30a is a plate-shaped product made of a magnetic material for forming the core of a coil. With the two projections 30b and 30c formed in partial regions of the core plate 30a as the cores, two coils, namely a primary coil (excitation coil) 30d and a secondary coil (detection coil) 30f, are formed. The projections 30b and 30c project toward an opening 8 (the space above the transport surface 3) through which the coins 100 are transported. The primary coil 30d and the projection 30b are respectively disposed to face the secondary coil 30f and the projection 30c, with the opening 8 in between. The primary coil 30d and the projection 30b are disposed below the glass plate 9 and covered with the glass plate 9. Here, instead of the primary coil, the secondary coil 30f and the projection 30c may be disposed below the glass plate 9 and covered with the glass plate 9.

The primary coil 30d has a winding (not illustrated) wound around the projection 30b, and the secondary coil 30f has a winding (not illustrated) wound around the projection 30c. In the present embodiment, the wiring of each coil can be a wire whose surface is insulated, such as a magnetic wire (e.g., polyurethane-coated copper wire). The primary coil 30d generates (applies) a magnetic field in the transport path 2 (opening 8), and the secondary coil 30f detects a change in the magnetic field generated in (applied to) the transport path 2 (opening 8).

The resonance circuit 44a for the diameter detection sensor resonates with the primary coil 30d at a frequency (e.g., 900 kHz) appropriate to detection of the diameter of the coin 100.

Figure 2:
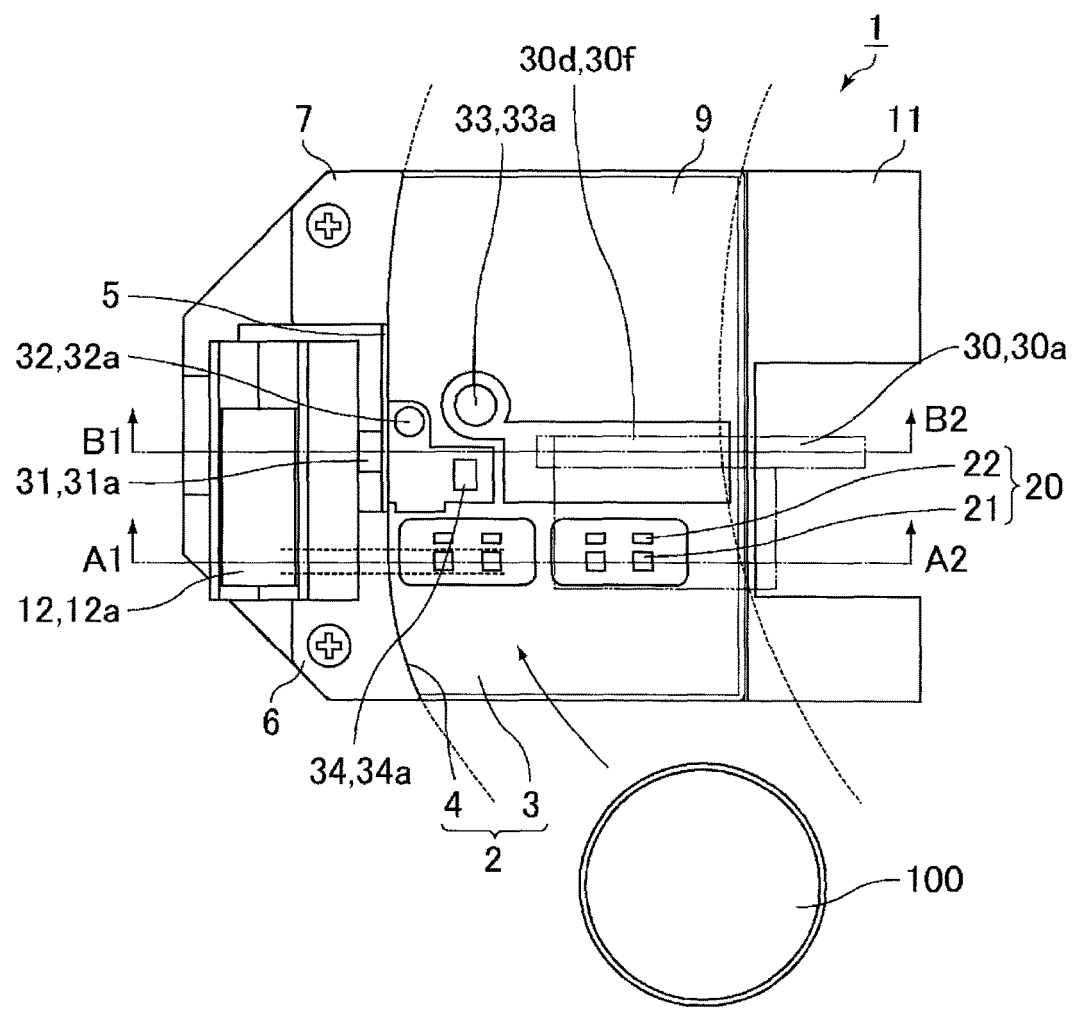
FIG. 2 is a schematic plan view of the coin recognition unit according to a first embodiment of the invention.
Figure 3:
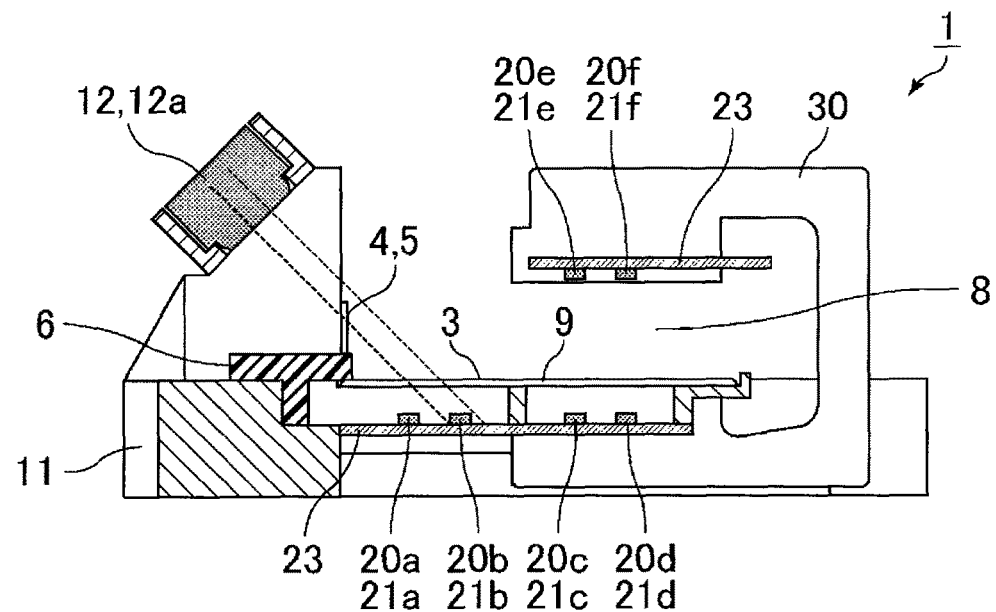
FIG. 3 is a schematic cross-sectional view of the coin recognition unit of a first embodiment of the invention, illustrating a cross section taken along the line A1-A2 in FIG. 2.

The primary coil 30d and the secondary coil 30f are disposed at substantially the center of the glass plate 9 in the transport direction as illustrated in FIG. 2, and are disposed from substantially the center of the glass plate 9 to the vicinity of the end of the glass plate 9 on the side opposite to the guide surface 4 (non-aligning side) in the width direction of the transport path 2 as illustrated in FIG. 4. Also, the positions of the primary coil 30d and the secondary coil 30f in the width direction of the transport path 2 are set such that, when a coin 100 with the smallest diameter among multiple types of the detection target coins 100 is transported while being guided to the guide surface 4 side, the edge of the coin 100 with the smallest diameter passes above the aligning-side end of the primary coil 30d and below the aligning-side end of the secondary coil 30f. With this configuration, when multiple types of the coins 100 with different diameters are transported while being aligned on the guide surface 4 side, the coins 100 passing between the secondary coil 30f and the primary coil 30d pass through the space between the coils 30d and 30f (magnetic field generated by the primary coil 30d) differently (with different degrees of overlap) depending on the diameters of the coins 100, so that the output signal from the diameter detection sensor 30 (secondary coil 30f) changes. That is, the diameter detection sensor 30 (the resonance circuit 44a for the diameter detection sensor and the secondary coil 30f) outputs a signal corresponding to the diameter of each coin 100. Thereby, the diameter detection sensor 30 detects the diameter of each coin 100.

The detection circuit 45a for the diameter detection sensor includes an amplifier circuit configured to amplify an output from the resonance circuit 44a for the diameter detection sensor and a direct-current converting circuit configured to convert a signal generated by the amplifier circuit to a direct current. The detection circuit 45b for the diameter detection sensor includes a filter circuit configured to remove noise from the output from the secondary coil 30f, an amplifier circuit configured to amplify a signal generated by the filter circuit, and a direct-current converting circuit configured to convert a signal generated by the amplifier circuit to a direct current.

The thickness detection sensor 31, the ring detection sensor 32, and the core detection sensor 33 each include a cylindrical pot core (not illustrated). The pot core is made of a magnetic material for forming the core of a coil. Coils 31a, 32a, and 33a of the respective sensors 31, 32, and 33 have a winding wound around the respective pot cores. These sensors 31, 32, and 33 are each configured to generate a magnetic field in the transport path 2 in response to the oscillation frequencies provided by the resonance circuits 44b, 44c, and 44d, and detect a change in the magnetic fields caused by passage of each coin 100 on the transport path 2.

The resonance circuit 44b for the thickness detection sensor resonates with the coil 31a of the thickness detection sensor 31 at a frequency (for example, 550 kHz) appropriate to detection of the thickness of the coin 100. The resonance circuit 44c for the ring detection sensor resonates with the coil 32a of the ring detection sensor 32 at a frequency (for example, 1.6 MHz) appropriate to detection of the material of the outer periphery of the coin 100. The resonance circuit 44d for the core detection sensor resonates with the coil 33a of the core detection sensor 33 at a frequency (for example, 160 kHz) appropriate to detection of the material of the center portion of the coin 100 other than the outer periphery.

As illustrated in FIG. 2, the coil 31a of the thickness detection sensor 31 is disposed at substantially the center of the glass plate 9 in the transport direction, and is disposed on the exterior side relative to the wall 5, i.e., on the side opposite to the transport surface 3 of the wall 5, in the width direction of the transport path 2. The coil 31a is covered with the wall 5. Also, as illustrated in FIG. 4, the lower edge of the coil 31a is positioned at substantially the same height as the transport surface 3 in the height direction, so that the thickness detection sensor 31 faces the peripheral surface of the transported coin 100. With this configuration, when multiple types of the coins 100 with different thicknesses are transported while being aligned on the guide surface 4 (wall 5) side, the coins 100 passing near the coil 31a pass by the coil 31a (pass through the magnetic field generated by the coil 31a) differently (with different degrees of overlap) depending on the thicknesses of the coins 100, so that the output signal from the thickness direction sensor 31 changes. That is, the thickness detection sensor 31 (coil 31a) outputs a signal corresponding to the thickness of each coin 100. Thereby, the thickness detection sensor 31 detects the thickness of each coin 100.

The detection circuit 45c for the thickness detection sensor includes an amplifier circuit configured to amplify the output from the coil 31a, and a direct-current converting circuit configured to convert a signal generated by the amplifier circuit to direct current.

The coil 32a of the ring detection sensor 32 is disposed below the glass plate 9 and covered with the glass plate 9. Also, as illustrated in FIG. 2, the coil 32a is disposed at substantially the center (yet slightly on the downstream side compared with the primary coil 30d and the secondary coil 30f of the diameter detection sensor 30 and the coil 31a of the thickness detection sensor 31) of the glass plate 9 in the transport direction, and is disposed adjacent to the guide surface 4 in the width direction of the transport path 2. With this configuration, when the coins 100 are transported while being aligned on the guide surface 4 (wall 5) side, the outer peripheries of the coins 100 pass above the coil 32a (in the magnetic field generated by the coil 32a), so that the output signal from the ring detection sensor 32 changes. That is, the ring detection sensor 32 (coil 32a) outputs a signal corresponding to the material of the outer periphery of each coin 100. Thereby, the ring detection sensor 32 detects the material of the outer periphery of each coin 100.

The detection circuit 45d for the ring detection sensor includes an amplifier circuit configured to amplify the output from the coil 32a, and a direct-current converting circuit configured to convert a signal generated by the amplifier circuit to direct current.

The coil 33a of the core detection sensor 33 is disposed below the glass plate 9 and covered with the glass plate 9. Also, as illustrated in FIG. 2, the coil 33a is disposed at substantially the center (yet slightly on the downstream side compared with the coil 32a of the ring detection sensor 32) of the glass plate 9 in the transport direction, and is disposed on the guide surface 4 side with a slight space from the coil 32a of the ring detection sensor 32 in the width direction of the transport path 2. With this configuration, when the coins 100 are transported while being aligned on the guide surface 4 (wall 5) side, the center portions (portions other than the outer peripheries) of the coins 100 pass above the coil 33a (in the magnetic field generated by the coil 33a), so that the output signal from the core detection sensor 33 changes. That is, the core detection sensor 33 (coil 33a) outputs a signal corresponding to the material of the center portion of each coin 100. Thereby, the core detection sensor 33 detects the material of the center portion of each coin 100.

The detection circuit 45e for the core detection sensor includes an amplifier circuit configured to amplify the output from the coil 33a, and a direct-current converting circuit configured to convert a signal generated by the amplifier circuit to direct current.

The magnetism detection sensor 34 includes a magnetism detecting element 34a such as a magnetoresistive element or a hole element (hole IC), and is disposed below the glass plate 9 and covered with the glass plate 9. Also, as illustrated in FIG. 2, the magnetism detecting element 34a is disposed at substantially the center (yet slightly on the upstream side compared with the coil 32a of the ring detection sensor 32 and the coil 33a of the core detection sensor 33) of the glass plate 9 in the transport direction, and is disposed on the guide surface 4 side with a slight space from the coil 32a of the ring detection sensor 32 in the width direction of the transport path 2. With this configuration, when the coins 100 are transported while being aligned on the guide surface 4 (wall 5) side, the coins 100 pass above the magnetism detecting element 34a, so that the output signal from the magnetism detection sensor 34 changes according to the presence or absence of the magnetism of each coin 100. Thereby, the magnetism detection sensor 34 detects the presence or absence of the magnetism of each coin 100.

The detection circuit 45f for the magnetism detection sensor includes an amplifier circuit configured to amplify the output from the magnetism detecting element 34a, and a filter circuit configured to remove noises from a signal generated by the amplifier circuit.

The AD converter 46 for the magnetic sensors is configured to sample the analog signals input by the detection circuits 45a, 45b, 45c, 45d, 45e, and 45f at every given time with a certain sampling interval, and convert each signal into a digital signal. The AD converter 46 may be provided to each of the detection circuits 45a, 45b, 45c, 45d, 45e, and 45f.

The controller 50 is composed of software programs for performing a variety of processes, a central processing unit (CPU) configured to execute the software programs, various hardware components controlled by the CPU, and a logical device such as a field programmable gate array (FPGA). For storage of the software programs and data necessary for operation of the components, components such as the memory 60 and separately provided, dedicated memory (e.g., RAM or ROM) and hard disks are used.

From entry of any of the coins 100 into the transport path 2 to passage of the coin 100, the controller 50 sequentially and repeatedly collects the outputs from the sensors, namely the signals converted by the AD converters 43 and 46, according to a change in diameter of the coin 100 (i.e., outputs from the diameter detection sensor 30), not according to the time, and stores the outputs in the memory 60. With this configuration, even when the transport speed of a coin 100 is varied, the controller 50 can collect the same signals (waveforms) as those in the case that the transport speed is not varied. Also, even in the case that any of the coins 100 stops above any of the sensors (on the transport path 2) and moves again, the controller 50 can collect the same signals as in the case of normal transport.

The memory 60 includes memory devices such as volatile or non-volatile memory devices and hard disks, and is used to store various data necessary for the processes performed in the coin recognition unit 1. The memory 60 also stores various threshold values 61 as described below.

The stain detector 51a detects the stain (difference in glossiness) of the detected coin 100 by comparing a signal input by the light-receiving circuit 42 through the AD converter 43 for the optical sensors to a stain threshold value stored in the memory 60.

The color detector 51b detects the difference in color of the detected coin 100 by comparing a signal input by the light-receiving circuit 42 through the AD converter 43 for the optical sensors to a color threshold value stored in the memory 60.

The diameter detector 51c detects a match between the diameter of the detected coin 100 and the diameters of the multiple types of the recognition target coins by comparing signals input thereto by the detection circuits 45a and 45b for the diameter detection sensor through the AD converter 46 for the magnetic sensors and diameter threshold values stored in the memory 60.

The thickness detector 51d detects a match between the thickness of the detected coin 100 and the thicknesses of the multiple types of the recognition target coins by comparing a signal input by the detection circuit 45c for the thickness detection sensor through the AD converter 46 for the magnetic sensors to thickness threshold values stored in the memory 60.

The ring-material detector 51e detects a match between the material of the outer periphery of the detected coin 100 and the materials of the multiple types of the recognition target materials by comparing a signal input by the detection circuit 45d for the ring detection sensor through the AD converter 46 for the magnetic sensors to ring-material threshold values stored in the memory 60.

The core-material detector 51f detects a match between the material of the center portion of the detected coin 100 and the materials of the multiple types of the recognition target materials by comparing a signal input by the detection circuit 45e for the core detection sensor through the AD converter 46 for the magnetic sensors to core-material threshold values stored in the memory 60.

The magnetism detector 51g detects the presence or absence of magnetism of the detected coin 100 by comparing a signal input by the detection circuit 45f for the magnetism detection sensor through the AD converter 46 to a magnetism threshold value stored in the memory 60.

The controller 50 performs a process for recognizing the denominations, stain, and other properties of the coins 100 based on the detection results from the detector 51. Specifically, the controller 50 determines whether the material of the outer periphery of each coin 100 is the same as or different from the material of the center portion of the coin 100 by comparing the detection result from the ring-material detector 51e and the detection result from the core-material detector 51f. The controller 50 determines whether the coin 100 is made of a single material or multiple materials, i.e., whether or not the coin 100 is a bi-metallic coin.

Figure 8:
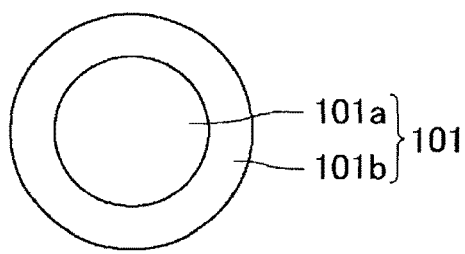
FIG. 8 is a schematic plan view illustrating an example of a bi-metallic coin (bicolor coin) that can be handled by the coin recognition unit of a first embodiment of the invention.
Figure 9A:
FIGS. 9A-9B are schematic views illustrating an example of a bi-metallic coin (clad coin) that can be handled by the coin recognition unit of a first embodiment of the invention, with FIGS. 9A and 9C each being a plan view, and FIGS. 9B) and 9D each being a cross-sectional view.
Figure 9B:
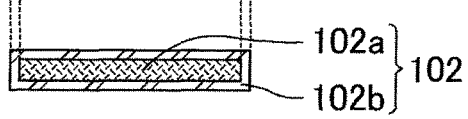
Figure 9C:
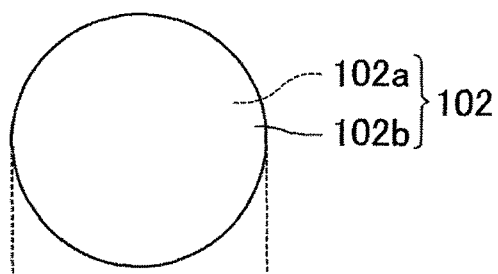
Figure 9D:
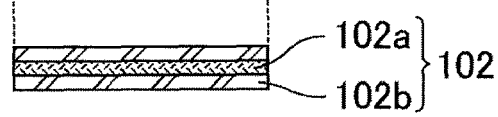

Bimetal coins include a bicolor coin 101 as illustrated in FIG. 8 and a clad coin 102 as illustrated in FIGS. 9A to 9D. The bicolor coin 101 is made of different metals in a core portion 101a (center portion) and a ring portion 101b (peripheral portion). The clad coin 102 is made of different metals in a core material 102a (center portion) and a surface layer 102b covering the core material 102a. Examples of the clad coin 102 include one obtained by plating a circular core material (base material) 102a and stamping the design on the material as illustrated in FIGS. 9A and 9B, and one obtained by punching a three-layer plate into a circle and stamping the design on the punched circle as illustrated in FIGS. 9C and 9D.

The controller 50 also determines whether or not the coin 100 is a stained coin based on the detection result from the stain detector 51a.

The controller 50 also performs denomination recognition and/or authentication of the coin 100 based on the detection result from the color detector 51b and the other detectors 51. The denomination recognition and authentication processes can be performed by common techniques, and are therefore not described in detail here.

As described above, the present embodiment employs individual sensors (the optical sensors 20 for stain and color detection, the diameter detection sensor 30, the thickness detection sensor 31, the ring detection sensor 32, the core detection sensor 33, and the magnetism detection sensor 34) disposed for the respective detectors. The coin recognition unit 1 of the present embodiment is therefore capable of performing highly precise detection such as detection of bi-metallic coins and stained coins, exhibiting increased recognition capacity (recognition precision).

Some of the optical sensors 20 (the optical sensors 20 on the lower side) and the multiple magnetic sensors, namely part of the diameter detection sensor 30 (primary coil 30d), the ring detection sensor 32, the core detection sensor 33, and the magnetism detection sensor 34, are covered with a glass plate 9. The glass plate 9 is disposed to cover the characteristic-collecting regions (the detection regions) of these sensors, constituting almost the entire transport surface 3. The transport surface 3 can thus be prevented from including height differences between these sensors, so that the behavior of the transported coins 100 can be stabilized and thus the recognition capacity of the coin recognition unit 1 can be increased. Also, the coin recognition unit 1 can surely be self-cleaned by the transported coins 100 and can easily be maintained clean.

Figure 10:
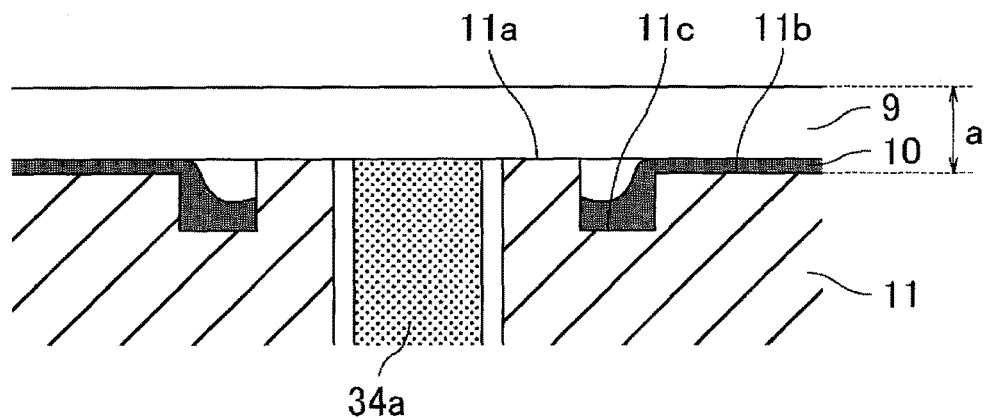
FIG. 10 is an enlarged schematic cross-sectional view of a bonding structure of a glass plate and a mounting member of the coin recognition unit of a first embodiment of the invention.

Also in the present embodiment, as illustrated in FIG. 10, the mounting member 11 includes three surfaces whose heights are different from each other, namely a first surface (hereinafter, also referred to as a glass-contact surface) 11a which is in direct contact with the glass plate 9, a second surface (hereinafter, also referred to as an adhesive application surface) 11b which is positioned lower than the glass-contact surface 11a and coated with an adhesive, and a third surface (hereinafter, also referred to as an adhesive-receiving surface) 11c which is positioned lower than the adhesive application surface 11b and between the glass-contact surface 11a and the adhesive application surface 11b. The glass plate 9 is bonded to the mounting member 11 by an adhesive member 10.

The glass plate 9 is mounted on the mounting member 11 by applying an appropriate amount of an adhesive to the adhesive application surface 11b and mounting the glass plate 9 onto the glass-contact surface 11a. The adhesive spreads out as it comes into contact with the glass plate 9, and an excess amount of the adhesive flows onto the adhesive-receiving surface 11c. The magnetism detecting element 34a of the magnetism detection sensor 34 is then attached to the exposed region of the glass plate 9.

Figure 11:
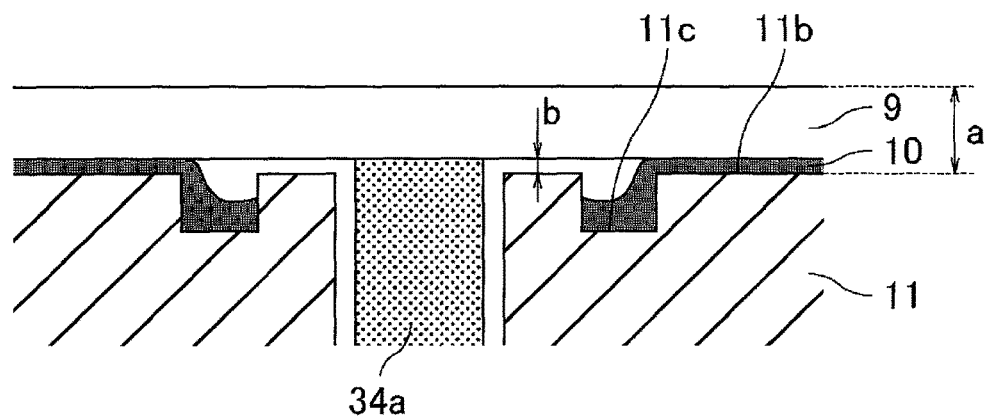
FIG. 11 is an enlarged schematic cross-sectional view of a coin recognition unit of according to a first embodiment of the invention.

In a modified example of the present embodiment, as illustrated in FIG. 11, the mounting member 11 lacks the glass-contact area 11a and includes only two surfaces whose heights are different from each other, the adhesive application surface 11b and the adhesive-receiving surface 11c. A gap b is adjacent to the magnetism detecting element 34a. This configuration leads to uneven thickness of the adhesive to give an unstable mounting height a for the glass plate 9. Also, this configuration fails to allow visual examination of spread of the adhesive to the mounting region of the magnetism detecting element 34*a* through the gap b, leading to unstable mounting precision of the magnetism detecting element 34*a*. Also, if the adhesive was applied insufficiently, this configuration allows entry of dust through the gap b in such a part with insufficient application, which results in unstable dust resistance in the vicinity of the magnetism detecting element 34*a*.

The embodiment illustrated in FIG. 10 employs a structure preventing an adhesive from flowing onto the glass-contact surface 11*a*, and thus the glass plate 9 comes into direct contact with the glass-contact surface 11*a*. The mounting height a for the glass plate 9 is therefore stable. Also, since the glass-contact surface 11*a* is provided around the magnetism detecting element 34*a*, the adhesive can be prevented from entering the mounting region for the magnetism detecting element 34*a*, so that the magnetism detecting element 34*a* can be mounted on the glass plate 9 with high precision and reliability. In addition, the glass-contact surface 11*a* provided around the magnetism detecting element 34*a* enables improvement of the dust resistance around the magnetism detecting element 34*a*.

In embodiments in which the glass plate 9 is made of sapphire glass, which has high transparency, mounting of the magnetism detecting element 34*a* and confirmation thereof are easy.

The material of the mounting member 11 and sapphire glass may have different linear expansion coefficients. For this reason, an increase in the size of the glass plate 9 may cause adhesion defects such as breaking or peeling of the adhesive member 10 due to the change in environment, such as temperature. By arranging the adhesive application surface 11*b* at a lower position than the glass-contact surface 11*a* as described above, the thickness of the adhesive member 10 enables prevention of adhesion defects due to the change in environment. More specifically, the configuration preferably satisfies the following: (thickness of adhesive member 10)×(elongation at break of adhesive member 10)>(temperature change)×(size of glass plate 9)×(difference in thermal expansion coefficient between mounting member 11 and sapphire glass).

Figure 12:
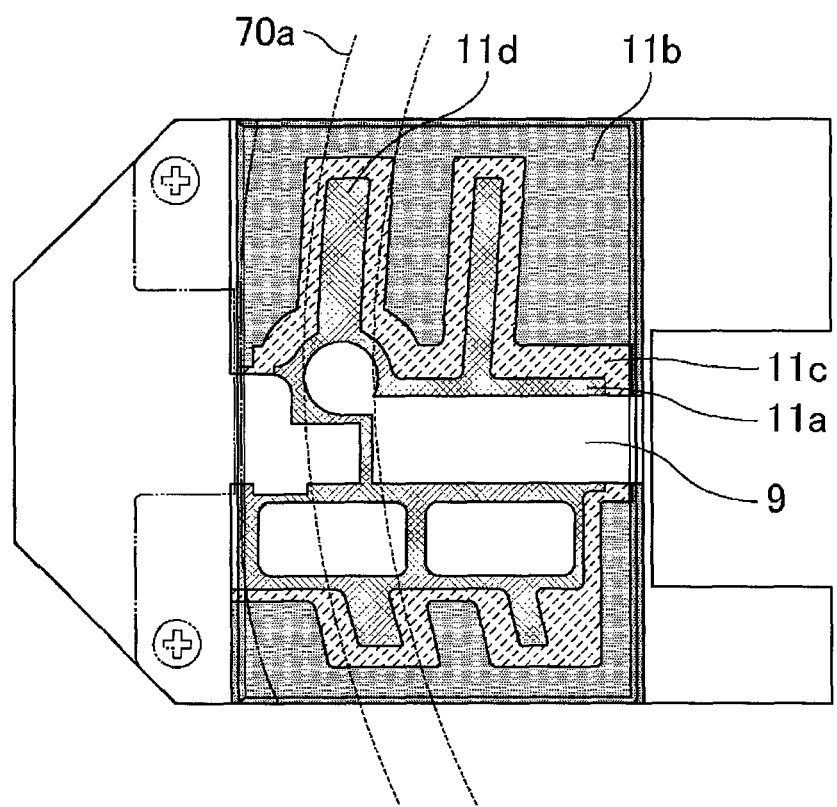
FIG. 12 is a schematic plan view of the coin recognition unit of a first embodiment of the invention and the path of a fin in a coin handling machine.
Figure 13:
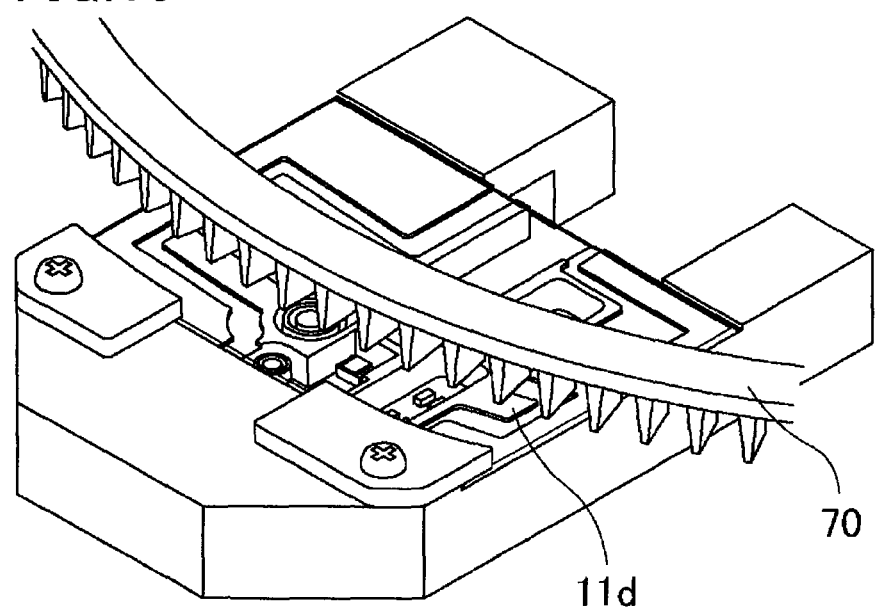
FIG. 13 is a schematic perspective view illustrating the coin recognition unit of a first embodiment of the invention and the fin in the coin handling machine.
Figure 14:
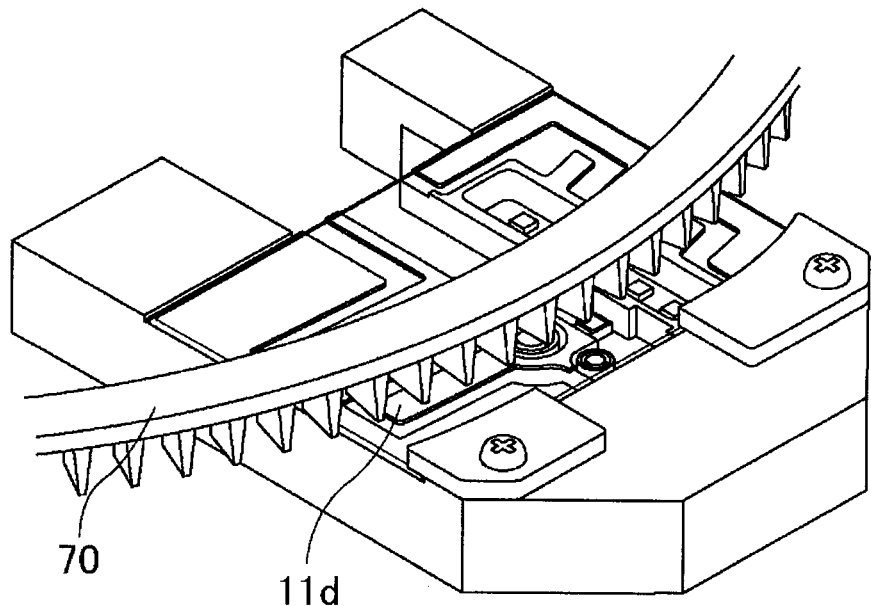
FIG. 14 is another schematic perspective view of the coin recognition unit of a first embodiment of the invention and the fin in the coin handling machine.

In the present embodiment, as illustrated in FIGS. 12 to 14, a rib 11*d* of the glass-contact surface 11*a* is present below a path 70*a* of a fin 70. This configuration in which the glass-contact surface 11*a* receives the glass plate 9 directly below the path 70*a* of the fin 70 can reduce strain of the glass plate 9 and stabilize the transport condition for the coins 100. The stabilized transport condition for the coins 100 also increases the recognition capacity of the coin recognition unit 1.

Figure 15:
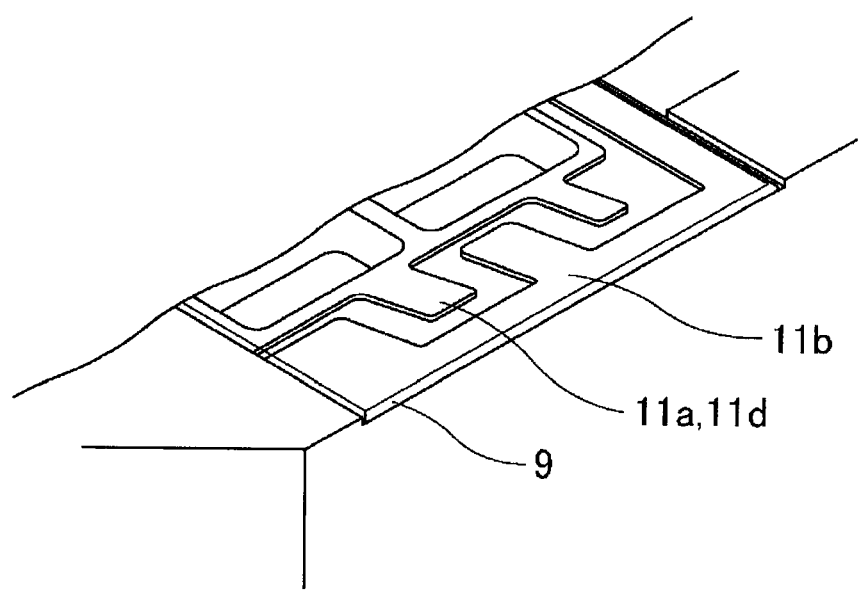
FIG. 15 is a schematic perspective view of a structure of the mounting member near the end of the glass plate of the coin recognition unit of a first embodiment of the invention.

As illustrated in FIG. 15, the rib 11*d* of the glass-contact surface 11*a* does not extend to the end surface of the glass plate 9. This configuration allows application of the adhesive to the entire outer periphery of the glass plate 9, effectively preventing entry of foreign substances such as dust into the coin recognition unit 1.

Figure 16:
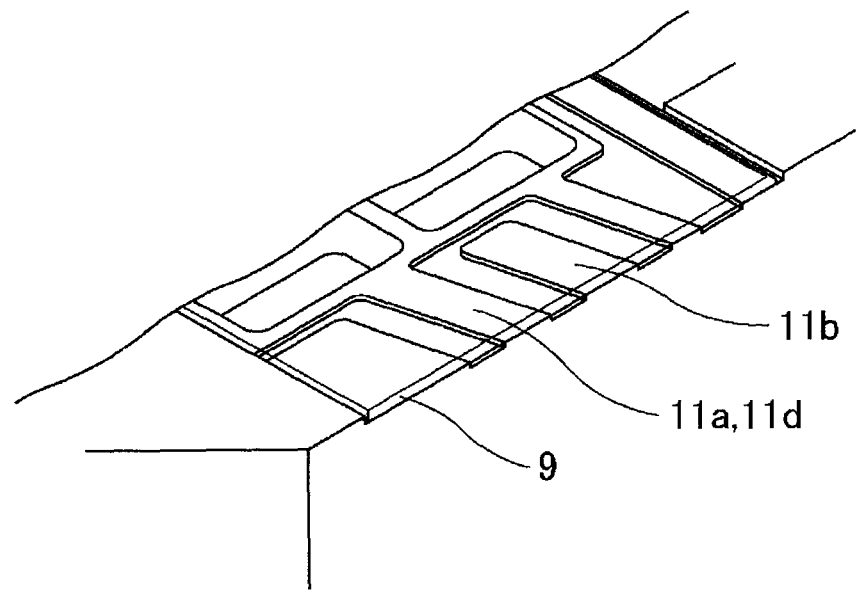
FIG. 16 is a schematic perspective view of a structure of the mounting member near the end of the glass plate of a coin recognition unit of a first embodiment of the invention.

In contrast, as illustrated in FIG. 16, if the rib 11*d* of the glass-contact surface 11*a* extends to the end surface of the glass plate 9, the glass-contact surface 11*a* without the adhesive applied thereto may allow entry of foreign substances such as dust into the coin recognition unit 1. Those foreign substances may cause strain or peeling of the glass plate 9.

Figure 17:
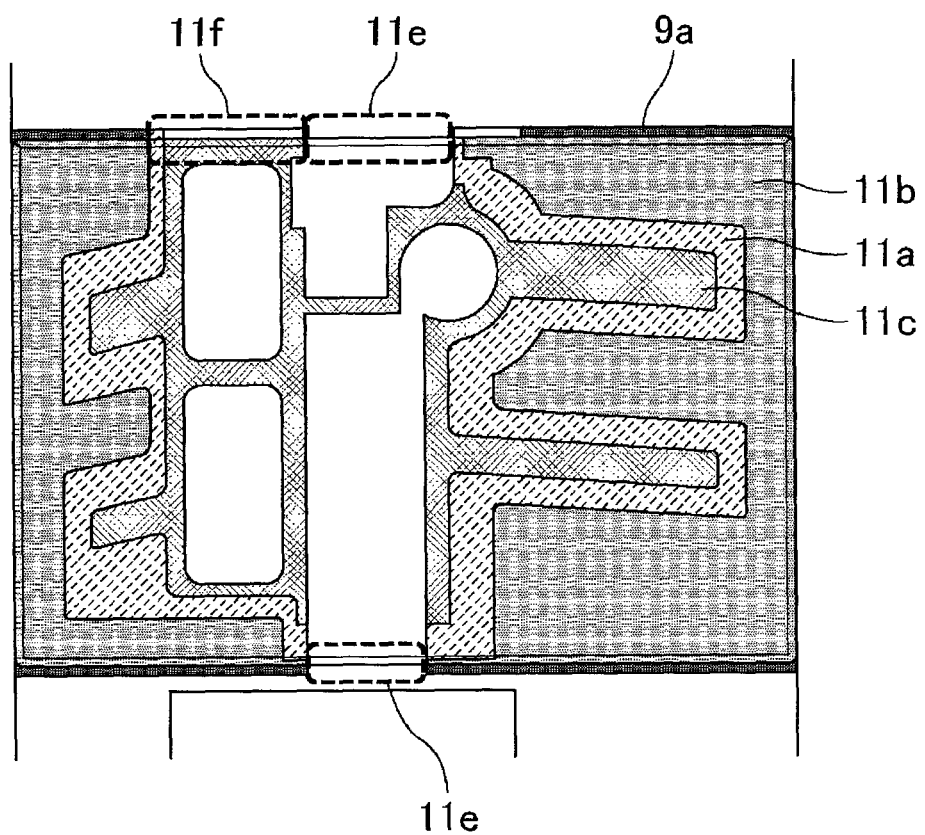
FIG. 17 is a schematic plan view of the coin recognition unit of a first embodiment of the invention describing a method for applying an adhesive.

In the regions without the adhesive application surface 11*b*, as illustrated in FIG. 17, the adhesive is applied along the end of the glass plate 9 from the back (mounting member 11 side) in regions 11*e* without the mounting member 11 while the adhesive is applied along the end of the glass plate 9 from the front (glass plate 9 side) in a region 11*f* with the glass-contact surface 11*a*. If the adhesive comes out of an end region 9*a* of the glass plate 9 adjacent to the adhesive application surface 11*b*, the leaked adhesive may preferably be wiped off.

As illustrated in FIGS. 2 and 17, in the present embodiment, the glass plate 9 has a rectangular shape while the transport path 2 has an arc shape. A glass plate 9 having a rectangular shape is easily processed and thus the cost is reduced, whereas use of a glass plate 9 (especially sapphire glass) having an irregular shape increases the cost. With the rectangular glass plate 9, the coin 100 having the largest diameter among the multiple types of the recognition target coins 100, when entering the coin recognition unit 1, partially moves on the mounting member 11, not on the glass plate 9. In the case that the coin 100 with the largest diameter is deformed, the coin 100 may not be able to move stably from the mounting member 11 to the glass plate 9.

Figure 18:
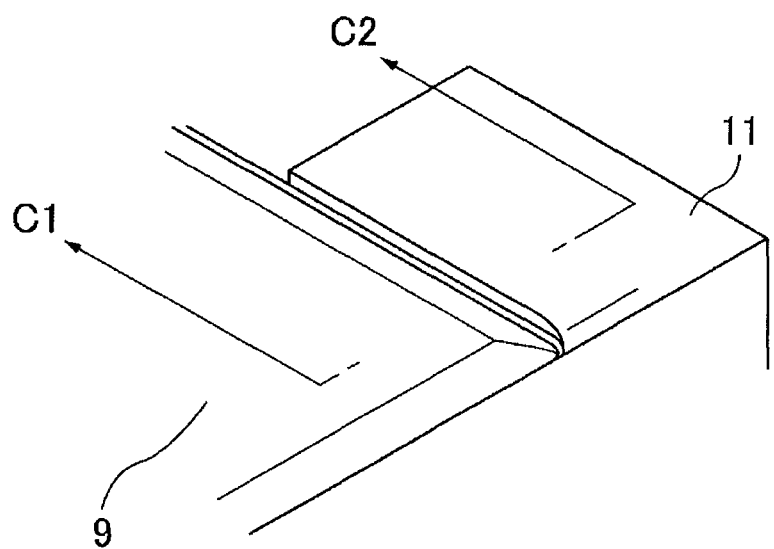
FIG. 18 is a schematic perspective view of a structure in a region including a corner of the glass plate of the coin recognition unit of a first embodiment of the invention.
Figure 19:
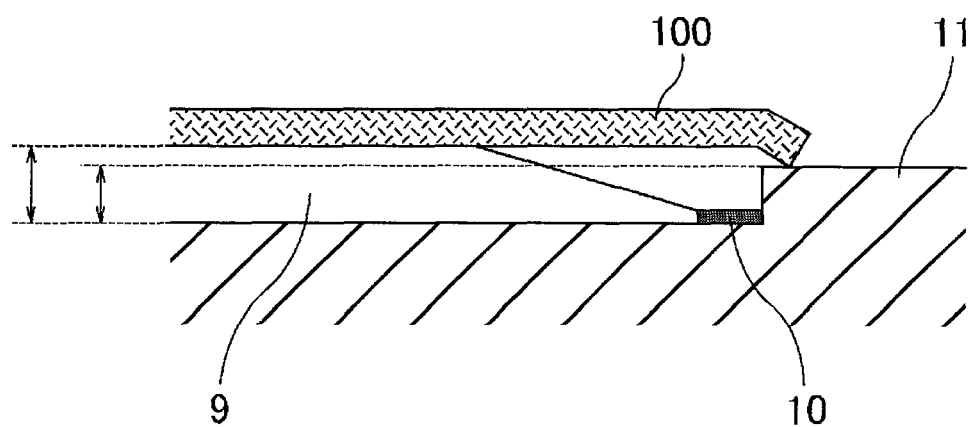
FIG. 19 is a schematic cross-sectional view of the coin recognition unit of a first embodiment of the invention, corresponding to a cross section taken along the line C1-C2 in FIG. 18.

In the present embodiment, as illustrated in FIGS. 18 and 19, the surface of the mounting member 11 is formed at a lower position than the surface of the glass plate 9, so that a deformed coin can move smoothly from the mounting member 11 to the glass plate 9. From the same viewpoint, the end of the glass plate 9 is tapered and the height of the mounting member 11 is set within the range of the height of the tapered portion.

Figure 20:
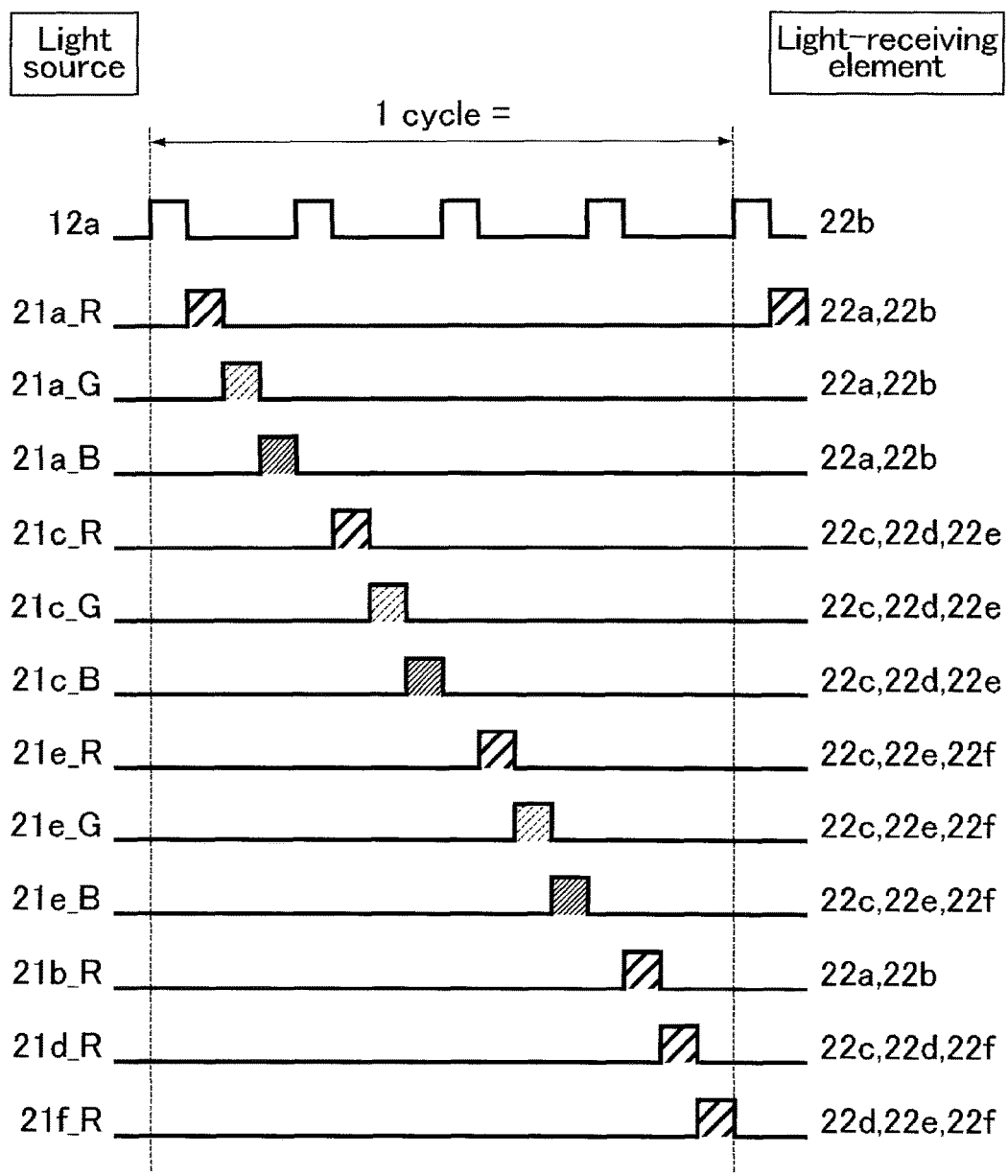
FIG. 20 is a timing chart describing a method for controlling light sources and light-receiving elements with a controller in the coin recognition unit of a first embodiment of the invention, in which light-source emission control and combinations of light-receiving elements from which an output is collected during emission of each light source are illustrated.

A recognition process based on the outputs from the optical sensors 20 in the present embodiment is further described. The light source 12*a* of the timing sensor 12 and the light sources 21*a* to 21*f* of the optical sensors 20 are under dynamic lighting control by the controller 50 at the timings and order as shown in FIG. 20. The controller 50 collects the outputs from the multiple light-receiving elements 22 based on emission from each light source. The controller 50 collects, based on emission of red light by the light source 21*a*, an output from the light-receiving element 22*a* of the same optical sensor 20*a* and an output from the light-receiving element 22*b* of the adjacent optical sensor 20*b*. The controller 50 collects output signals from the light-receiving elements 22*a* and 22*b* that have received reflected light resulting from reflection of the red light on the coin 100 during the emission period of the red light by the light source 21*a*. The controller 50 therefore collects output signals from two light-receiving elements 22 which simultaneously receive reflected light resulting from reflection of light emitted by each light source 21 and reflected on the coin 100 and which are at different distances from the light source 21.

The controller 50 performs the recognition process based on the collected signals. Specifically, the controller 50 determines the degree of stain (glossiness) of the coin 100 based on the output signal from the light-receiving element 22 closest to each light source 21, namely the light-receiving element 22 included in the same optical sensor 20 as the light source 21. The output signal from the light-receiving element 22 closest to each light source 21 contains a relatively large amount of specular reflection light components among reflected light components on the surface of the coin 100.

The controller 50 also determines the color of the coin 100 based on an output signal from the light-receiving element 22 second closest to each light source 21, namely the light-receiving element of the optical sensor 20 adjacent to the optical sensor 20 including the light source 21 in the width direction of the transport path 2. The output signal from the light-receiving element 22 second closest to each light source 21 contains a relatively large amount of diffuse reflection light components among reflected light components on the surface of the coin 100.

Hereinafter, a specific example showing actual experimental results of the optical sensors 20 are described.

Figure 21:
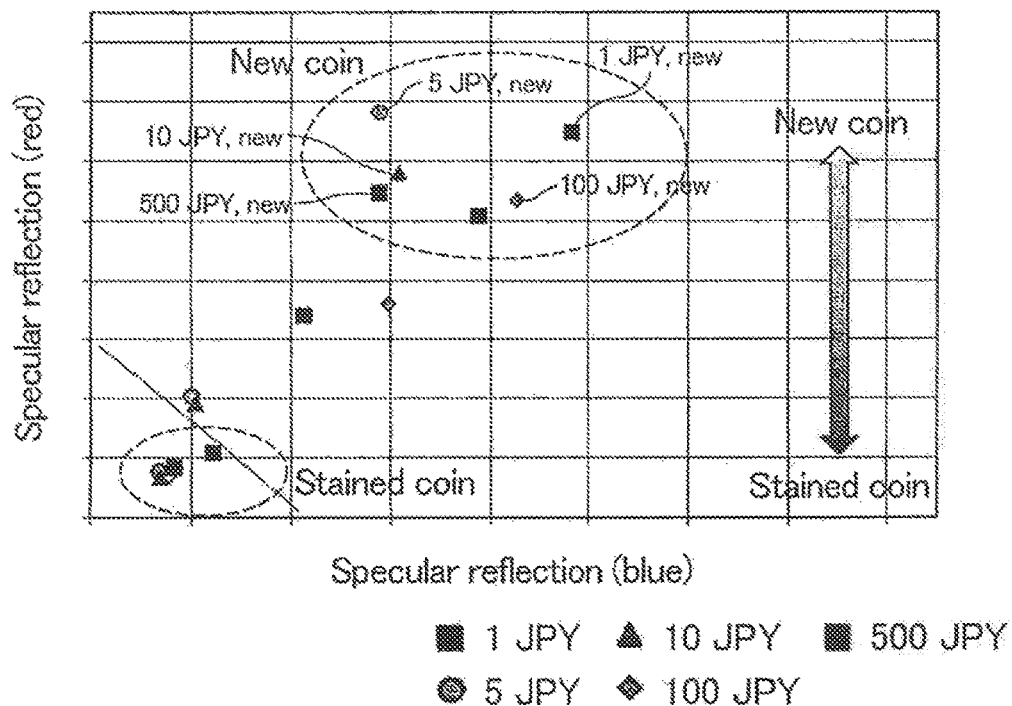
FIG. 21 is a scatter diagram showing the output results (outputs containing many specular reflection light components) of an optical sensor of the coin recognition unit of a first embodiment of the invention.
Figure 22:
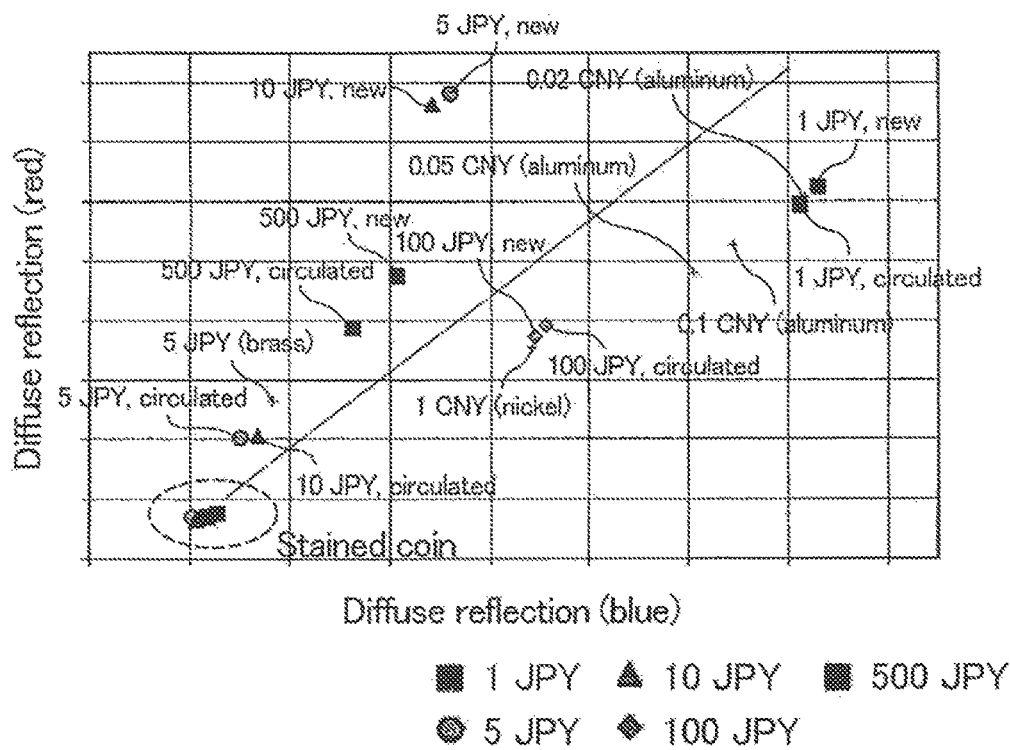
FIG. 22 is a scatter diagram showing the output results (outputs containing many diffuse reflection light components) of the optical sensor of the coin recognition unit of a first embodiment of the invention.

Various types of coins 100 including new coins, stained coins, and circulated coins were irradiated with red light and blue light from any of the light sources 21 to cause reflection on each coin 100. The output from the light-receiving element 22 closest to the light source 21 and the output from the light-receiving element 22 second closest to the light source 21 were collected and plotted in FIGS. 21 and 22. FIG. 21 shows the outputs from the light-receiving element 22 closest to the light source 21, the outputs containing many specular reflection light components. FIG. 22 shows the outputs from the light-receiving element 22 second closest to the light source 21, the outputs containing many diffuse reflection light components. In each figure, the vertical axis represents the outputs of red reflected light, and the horizontal axis represents the outputs of blue reflected light.

As shown in FIG. 21, the outputs containing many specular reflection light components of new coins are distributed in the upper right portion of the diagram where both red and blue reflection components are large, while those of stained coins are distributed in the lower left portion of the diagram where both red and blue reflection components are small. This means that, in the case of using the optical sensors 20, stained coins and the other coins can be recognized by setting a stained coin threshold (e.g., threshold represented by a function obtained from the distribution of actually measured values) using a line segment (e.g., one-dot chain line in FIG. 21) separating stained coins and the other coins.

As shown in FIG. 22, the outputs containing many diffuse reflection light components of yellowish coins such as 5 yen coins (brass) and 10 yen coins (bronze) contain many red reflection components, while those of silver (white) coins such as 1 yen coins (aluminum) and 100 yen coins (cupronickel) contain many blue reflection components. This means that, in the case of using the optical sensors 20, yellowish coins and silver coins can be recognized by setting a color threshold (e.g., threshold represented by a function obtained from the distribution of actually measured values) using a line segment (e.g., one-dot chain line in FIG. 22) separating yellowish coins and silver coins. The present embodiment thus enables detection of difference in color of the coins 100 based on the output results containing many diffuse reflection components, and the detection results can be used for recognition of the denominations of the coins 100.

Although the case has been described in which the applied light components are red light and blue light in the above experimental results, the type of the light components used may be any type, such as a set of light components having the respective three colors of red, green, and blue, and stained coins may be recognized based only on the outputs relating to the application of red light.

Also, in the above experimental results, the case has been described in which difference in color of the coins 100 was determined based on an output from the light-receiving element 22 second closest to the light source 21. Here, the light-receiving element 22 used for detection of difference in color of the coins 100 may be any light-receiving element 22 capable of receiving light applied by the light source 21 and reflected on the coin 100 except for the light-receiving element 22 closest to the light source 21. It may be a light-receiving element 22 third closest to the light source 21 (i.e., the light-receiving element 22 adjacent, in the direction away from the light source 21, to the light-receiving element 22 second closest to the light source 21). Still, for stable outputs from the light-receiving element 22 and increased detection precision of difference in color of the coins 100, the difference in color of the coins 100 is preferably detected based on an output from the light-receiving element 22 second closest to the light source 21.

As described above, the coin recognition unit 1 of the above embodiment includes the magnetic sensors 30, 32, and 33, each configured to collect magnetic characteristics of each transported coin 100, the at least one optical sensor 20 disposed with a space from the magnetic sensors 30, 32, and 33 and configured to collect optical characteristics of the surface of the coin 100. The controller 50 is configured to control the magnetic sensors 30, 32, and 33 and the at least one optical sensor 20 and perform a recognition process. The coin recognition unit 1 therefore has high recognition capacity for the coins 100, and can perform detection requiring high precision such as detection of bi-metallic coins and stained coins.

Also, the coin recognition unit 1 of the above embodiment includes a glass plate 9 constituting the transport surface 3 on which the coins 100 are transported and having a larger size than the coins 100, and the glass plate 9 covers at least part of each magnetic sensor 30, 32, or 33 and at least part of each optical sensor 20. The transport surface 3 can be prevented from including height differences between these sensors, so that the behavior of the transported coins 100 can be stabilized and thus the recognition capacity of the coin recognition unit 1 can be increased.

The coin recognition unit 1 of the above embodiment also includes the at least one light source 21 configured to irradiate the face or back of each transported coin 100 with light, and the light-receiving elements 22 each configured to receive light reflected on the coin 100 and disposed at different distances from the at least one light source 21. The controller 50 is configured to collect output signals from the light-receiving elements 22 that have received light reflected on the coin 100 in the same period of time, and perform the recognition process based on the collected output signals. The coin recognition unit 1 therefore allows recognition of a stain in a broad range of at least one of the face and back of each coin 100. The coin recognition unit 1 can perform the recognition process based on an output signal from each light-receiving element 22, the coin recognition unit 1 can detect a partial stain on the coin 100. In addition, the coin recognition unit 1 can detect not only the degree of stain (glossiness) of the coin 100 but also a difference in color of the coins 100.

In the coin recognition unit 1 of the above embodiment, the at least one light source 21 includes a plurality of the light sources 21 corresponding to the respective light-receiving elements 22, each of the light-receiving elements 22 and the corresponding light source 21 constituting one optical sensor 20. The controller 50 is configured to control the optical sensors 20. The optical sensors 20 include the optical sensors 20 disposed in a direction crossing the transport direction of the coins 100 on the side facing the back of each transported coin 100 and the optical sensors 20 disposed in a direction crossing the transport direction on the side facing the face of each transported coin 100. The coin recognition unit 1 therefore allows recognition of a stain in a broad range of both of the face and back of each coin 100.

Figure 23:
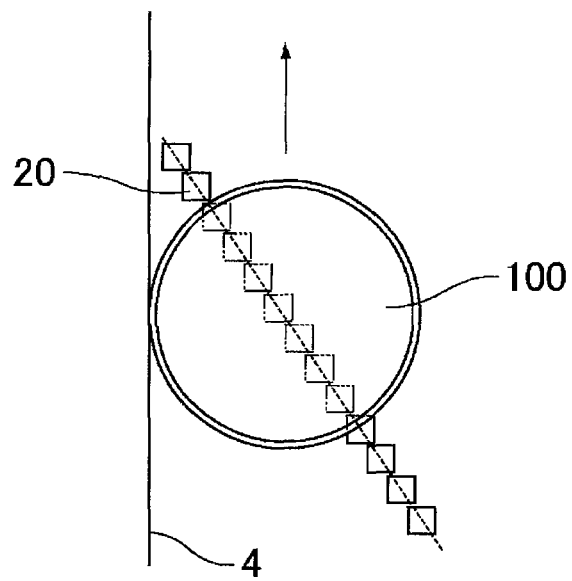
FIG. 23 is a schematic plan view of a coin recognition unit of a modified example of a first embodiment of the invention.

Although the case has been described in the above embodiment in which the adjacent optical sensors 20 are disposed with a space from each other in the direction orthogonal to the transport direction of the coins 100, the optical sensors 20 (light sources 21 and light-receiving elements 22) may be disposed to partially overlap each other in the direction orthogonal to the transport direction of the coins 100 as illustrated in FIG. 23. Such a configuration enables more specific detection of the optical characteristics of the surface of each coin 100, further increasing the recognition capacity of the coin recognition unit 1.

Figure 24:
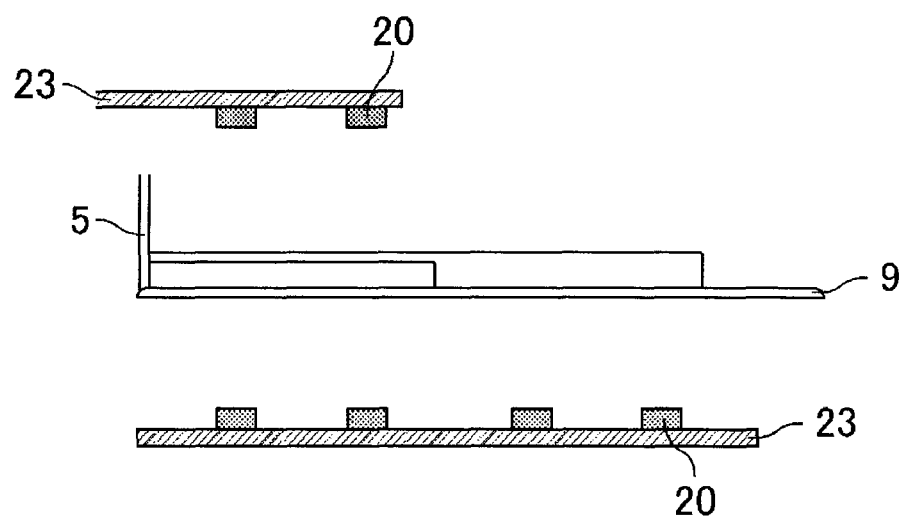
FIG. 24 is a schematic cross-sectional view describing a positional relationship between coins and optical sensors in a modified example of a first embodiment of the invention.
Figure 25:
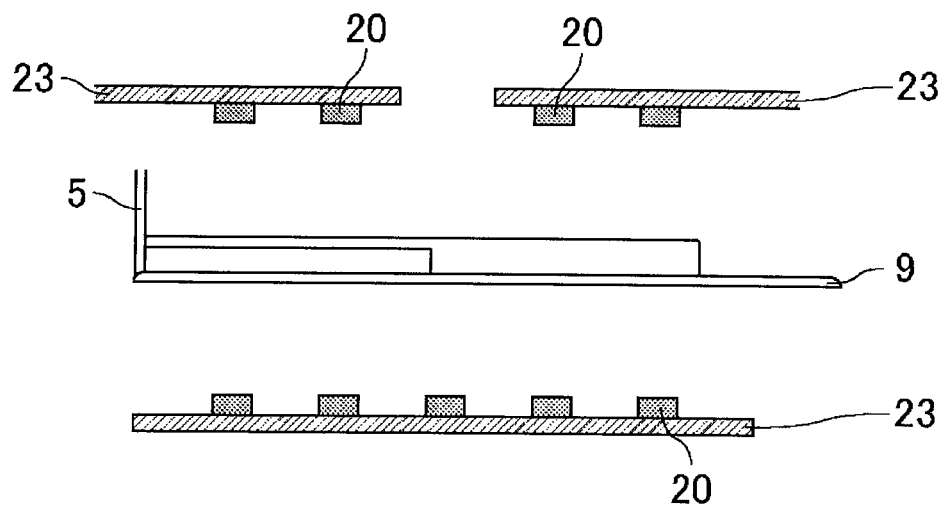
FIG. 25 is a schematic cross-sectional view describing another positional relationship between coins and optical sensors in a modified example of a first embodiment of the invention.
Figure 26:
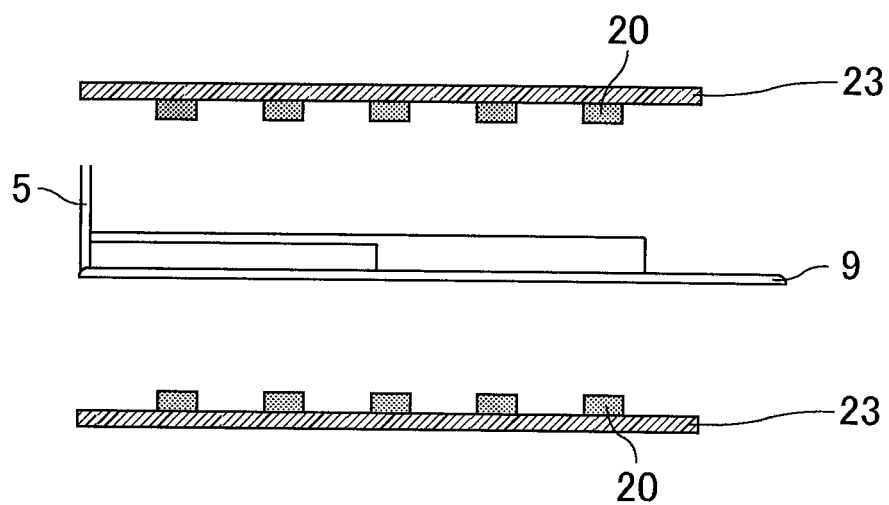
FIG. 26 is a schematic cross-sectional view describing yet another positional relationship between coins and optical sensors in a modified example of a first embodiment of the invention.

In the above embodiment, an example has been described in which two optical sensors 20 are disposed above and on the non-aligning side of the glass plate 9 (transport surface 3) and four optical sensors 20 are disposed below the glass plate 9 (transport surface 3). The number and positions of the optical sensors 20, however, are not particularly limited to the example illustrated in FIGS. 6A and 6B as long as at least two optical sensors 20 are disposed adjacent to each other. As illustrated in FIG. 24, the optical sensors 20 on the upper side may be disposed on the aligning side. As illustrated in FIG. 25, the optical sensors 20 may be disposed above the glass plate 9 to cover each coin 100 from one end to the other end, except for the center portion through which a belt (not illustrated) as a transport unit is disposed. Furthermore, as illustrated in FIG. 26, the optical sensors 20 may be disposed above and below the glass plate 9 at equal intervals to cover each coin 100 from one end to the other end, without consideration on the transport unit. In this case, a configuration with the glass plate 9 tilted is preferred so that the coins 100 move by their own weights.

The embodiments of the present invention have been described with reference to the drawings. The embodiments, however, are not intended to limit the scope of the present invention. The configurations in the respective embodiments may appropriately be combined or modified within the spirit of the present invention.

What is claimed is:

1. A coin recognition unit comprising:
   magnetic sensors each configured to collect magnetic characteristics of a transported coin;
   at least one optical sensor disposed with a space from the magnetic sensors and configured to collect optical characteristics of a surface of the coin;
   a glass plate constituting a transport surface on which the coin is transported and having a larger size than the coin; and
   a controller configured to control the magnetic sensors and the at least one optical sensor and perform a recognition process,
   wherein the glass plate covers at least part of each magnetic sensor and at least part of each optical sensor.

2. The coin recognition unit according to claim 1, wherein the magnetic sensors include a diameter detection sensor configured to output a signal corresponding to the diameter of the coin, and
   the diameter detection sensor includes an excitation coil and a detection coil that are disposed to face each other with the transport surface in between.

3. The coin recognition unit according to claim 1, wherein the magnetic sensors include a magnetism detection sensor configured to detect the presence or absence of magnetism of the coin, and
   the magnetism detection sensor includes a magnetism detecting element.

4. The coin recognition unit according to claim 1, wherein the magnetic sensors include a material detection sensor configured to detect material characteristics of the coin.

5. The coin recognition unit according to claim 4, wherein the material detection sensor includes a first material detection sensor disposed near an outer periphery of the transported coin, and a second material detection sensor disposed near a center portion, excluding the outer periphery, of the transported coin, and
   the controller is configured to compare an output signal from the first material detection sensor and an output signal from the second material detection sensor to determine whether the coin is made of a single material or multiple materials.

6. The coin recognition unit according to claim 1, wherein the at least one optical sensor includes a light source configured to emit light having multiple wavelengths and a light-receiving element.

7. The coin recognition unit according to claim 6, wherein the at least one optical sensor comprises a plurality of optical sensors that are disposed in a direction crossing the transport direction of the coin.

8. The coin recognition unit according to claim 7, wherein the optical sensors are disposed in a direction orthogonal to the transport direction and parallel to the transport surface.

9. The coin recognition unit according to claim 7, wherein the optical sensors partially overlap each other in a direction orthogonal to the transport direction of the coin.

10. The coin recognition unit according to claim 1, wherein the controller is configured to determine the presence or absence of the coin on the transport surface based on an output signal from the at least one optical sensor.

11. The coin recognition unit according to claim 1, further comprising
    a wall disposed on one side of the transport surface and a thickness detection sensor disposed on the side of the wall opposite to the transport surface,
    wherein the coin is transported on the transport surface while being aligned on the wall side, and
    the thickness detection sensor is a magnetic sensor configured to output a signal corresponding to the thickness of the coin.

12. The coin recognition unit according to claim 1, wherein the glass plate is made of sapphire glass.

13. The coin recognition unit according to claim 1, further comprising
    a mounting member on which the glass plate is mounted, and an adhesive member binding the glass plate to the mounting member,
    wherein the mounting member includes:
    a first surface being in direct contact with the glass plate;
    a second surface disposed at a lower position than the first surface and coated with an adhesive; and
    a third surface disposed at a lower position than the second surface and between the first surface and the second surface.

* * * * *